(12) United States Patent
Johnson et al.

(10) Patent No.: US 7,778,948 B2
(45) Date of Patent: Aug. 17, 2010

(54) MAPPING EACH OF SEVERAL COMMUNICATIVE FUNCTIONS DURING CONTEXTS TO MULTIPLE COORDINATED BEHAVIORS OF A VIRTUAL CHARACTER

(75) Inventors: W. Lewis Johnson, Venice, CA (US); Hannes Högni Vilhjálmsson, Reykjavik (IS)

(73) Assignee: University of Southern California, Los Angeles, CA (US)

( * ) Notice: Subject to any disclaimer, the term of this patent is extended or adjusted under 35 U.S.C. 154(b) by 489 days.

(21) Appl. No.: 11/550,757

(22) Filed: Oct. 18, 2006

(65) Prior Publication Data
US 2007/0206017 A1 Sep. 6, 2007

Related U.S. Application Data

(63) Continuation of application No. 11/421,752, filed on Jun. 1, 2006, now abandoned.

(60) Provisional application No. 60/686,900, filed on Jun. 2, 2005.

(51) Int. Cl.
G06F 17/00 (2006.01)
G06F 17/20 (2006.01)
G06F 17/27 (2006.01)
G06F 17/28 (2006.01)

(52) U.S. Cl. ................. 706/45; 704/8; 704/9

(58) Field of Classification Search ............ 706/45
See application file for complete search history.

(56) References Cited

U.S. PATENT DOCUMENTS

| 4,459,114 A | 7/1984 | Barwick |
| 5,393,072 A | 2/1995 | Best |
| 5,882,202 A | 3/1999 | Sameth et al. |
| 6,234,802 B1 * | 5/2001 | Pella et al. ............ 434/156 |
| 6,364,666 B1 | 4/2002 | Jenkins et al. |
| 6,527,556 B1 | 3/2003 | Koskinen |
| 6,944,586 B1 | 9/2005 | Harless et al. |
| 7,225,233 B1 | 5/2007 | Fenton |
| 2001/0041328 A1 | 11/2001 | Fisher |
| 2002/0135618 A1 * | 9/2002 | Maes et al. ............ 345/767 |
| 2002/0150869 A1 * | 10/2002 | Shpiro ............ 434/156 |
| 2003/0033152 A1 | 2/2003 | Cameron |
| 2003/0064765 A1 * | 4/2003 | Kobayashi et al. ........ 463/2 |
| 2004/0023195 A1 | 2/2004 | Wen et al. |
| 2004/0104935 A1 | 6/2004 | Williamson et al. |
| 2004/0128350 A1 | 7/2004 | Topfl et al. |
| 2004/0180311 A1 | 9/2004 | Budra et al. |
| 2004/0181376 A1 | 9/2004 | Fables et al. |
| 2004/0186743 A1 * | 9/2004 | Cordero, Jr. ............ 705/1 |

(Continued)

OTHER PUBLICATIONS

Marsella et al., The DARWARS Tactical Language Training System, 2004.*

(Continued)

*Primary Examiner*—Donald Sparks
*Assistant Examiner*—Nathan H Brown, Jr.
(74) *Attorney, Agent, or Firm*—McDermott Will & Emery LLP

(57) ABSTRACT

A character programming and control system and method for programming and controlling a virtual character during a social simulation, a character programming method for programming the actions of a virtual character, and a system and method for developing social skills of a user.

27 Claims, 17 Drawing Sheets

U.S. PATENT DOCUMENTS

| | | |
|---|---|---|
| 2004/0215446 A1 | 10/2004 | Nakano |
| 2005/0069846 A1 | 3/2005 | Acevedo |
| 2005/0095569 A1 | 5/2005 | Franklin |
| 2005/0175970 A1 | 8/2005 | Dunlap et al. |
| 2005/0255434 A1 | 11/2005 | Lok et al. |
| 2006/0053012 A1 | 3/2006 | Eayrs |
| 2006/0074659 A1 | 4/2006 | Adams et al. |
| 2006/0111902 A1 | 5/2006 | Julia et al. |
| 2006/0122834 A1 | 6/2006 | Bennett |
| 2007/0015121 A1 | 1/2007 | Johnson et al. |

OTHER PUBLICATIONS

Beck, J. and Sison, J. (2004). Using Knowledge Tracing to Measure Student Reading Proficiencies. In Proceedings of ITS 2004. In Proceedings of the 2004 Conference on Intelligent Tutoring Systems, 624-634 (Berlin: Springer-Verlag).

Gales, M. and Woodland, P. (2006) Recent Progress in Large Vocabulary Continuous Speech Recognition: An HTK Perspective. Tutorial presented at ICASSP, 2006, IEEE Computer Society Press.

Hill, R., Gratch, J., Marsella, S., Rickel, J., Swartout, W. and Traum, D., Virtual Humans in the Mission Rehearsal Exercise System. Künstliche Intelligenz vol. 17, No. 4, (2003), pp. 5-10.

Kopp, S., Krenn, B., Marsella, S., Marshall, A. C. Pelachaud, H. Pirker, K. Thórisson, H. Vilhjálmsson (2006). Towards a Common Framework for Multimodal Generation in ECAS: The Behavior Markup Language. In 2006 Conference on Intelligent Virtual Agents.

Lee, A., Kawahara, T., and Shikano, K. "Julius. (2001) An Open Source Real-Time Large Vocabulary Recognition Engine." In Proc. European Conference on Speech Communication and Technology (EUROSPEECH) 2001, pp. 1691-1694.

Marsella, S., Johnson, W.L., & LaBore, C. (2003) An Interactive Pedagogical Drama for Health Interventions 2003 in Hoppe, U., and Verdejo, F., (Eds.), Artificial Intelligence in Education: Shaping the Future of Learning through Intelligent Technologies,. Amsterdam: IOS Press, pp. 341-348.

Marsella, S., Pynadath, D.V., & Read, S. (2004) PsychSim: Agent-Based Modeling of Social Interactions and Influence. In Proceedings of the International Conference on Cognitive Modeling, 2004, pp. 243-249.

Pellom, B. (2001) SONIC: The University of Colorado Continuous Speech Recognizer, University of Colorado, tech report #TR-CSLR-2001-01, Boulder, Colorado, Mar. 2001.

Placeway, P., Chen, S., Eskenazi, M., Jain, U., Parikh, V., Raj, B., Ravishankar, M., Rosenfeld, R., Seymore, K., Siegler, M., Stern, R., Thayer, E. (1997) The 1996 HUB-4 Sphinx-3 System, Proc, DARPA Speech Recognition Workshop, Chantilly, Virginia, Morgan Kaufmann Publishers.

Traum, D., Swartout, W., Gratch, J. and Marsella, S. (2002) Virtual Humans for non-team interaction training. Copyright 2002, ACM.

Vilhjálmsson, H. and Marsella, S. C. (2005) Social Performance Framework. Presented at Workshop on Modular Construction of Human-Like Intelligence, 20th National AAAI Conf. on Artificial Intelligence, 2005,.AAAI Press.

International Search Report for PCT Application Serial No. PCT/US06/21513, mailed Aug. 8, 2008.

International Search Report for PCT Application Serial No. PCT/US08/68837, mailed Oct. 8, 2008.

Official Report, mailed Feb. 15, 2010, Australian Patent Application No. 2006252392, entitled "Interactive Foreign Language Teaching," 2 pages.

\* cited by examiner

Engaging in conversation

Exchanging turns

FIG. 12

□ Virtual Culture Engine □ □ ⊠

TACTICAL DARWARS Tactical Language Training Project
I R A Q I

Skill proficiency
[+] Communication

| Skill name | | |
|---|---|---|
| [ - ] Communication | 10.00 | 13% |
| Understand the importance and usefulness | 0.0 | |
| Understand the importance of politeness an | 0.0 | |
| Understand the importance and significanc | 0.0 | |
| Understand the important features of body | 0.0 | |
| Understand characteristic gestures in the T | 0.0 | |
| Use the proper gesture of respect accompa | 0.0 | |
| Understand the etiquette for introducing oth | 0.0 | |
| Understand the importance of eye contact i | 10.0 | |
| [+] Greet strangers | 8.00 | 17% |
| [+] Extend and respond to invitations | 1.00 | 13% |
| [+] Pronunciation | 1.00 | 11% |
| [+] Social structure, social behavior and busine | 1.00 | 6% |
| [+] Identify military ranks and titles | 0.00 | 0% |
| [+] Use the telephone | 0.00 | 0% |
| [+] Read a map | 0.00 | 0% |

61
62

[ Quiz mode ]   [ Back ]

Click the 'Quiz mode' button to view quiz scores

MAPPING EACH OF SEVERAL COMMUNICATIVE FUNCTIONS DURING CONTEXTS TO MULTIPLE COORDINATED BEHAVIORS OF A VIRTUAL CHARACTER

CROSS-REFERENCE TO RELATED APPLICATIONS

This application is a continuation of U.S. patent application Ser. No. 11/421,752, filed Jun. 1, 2006, now abandoned entitled "Interactive Foreign Language Teaching,", which is based upon and claims priority to U.S. Provisional Patent Application Ser. No. 60/686,900, entitled "Tactical Language Training System," filed Jun. 2, 2005. The entire content of both applications is incorporated herein by reference.

STATEMENT REGARDING FEDERALLY SPONSORED RESEARCH

This invention was made with government support under Contract No. N00014-03-1-0624 awarded by the Office of Naval Research. The government has certain rights in the invention.

BACKGROUND

1. Field

The application of communication skills, such as learning foreign languages and cultures, learning other skills where face to face communication plays a key role (including law enforcement and clinical practice), conducting plant safety inspections, and providing customer service.

2. Description of Related Art

Methods and products for teaching foreign languages are known. One such product is called Rosetta Stone. It presents images, spoken utterances, and written phrases, and has the user indicate which image matches which spoken utterance or phrase. It has some ability to generate feedback on the learner's speech, by presenting spectrograms of the learner's speech which the learner must then analyze and compare with spectrograms of native speakers.

Another product that is used to teach foreign languages is the TeLL me More product series. It includes lesson pages that present language material. It includes some structured dialog practice, where the learner hears an utterance and sees it in printed form, sees a set of possible responses (typically two to four), and selects one of the presented responses. The choices may not vary according to the learner's level of proficiency. This may differ from real conversation since, in real conversation, speakers are not given preset choices of things to say at each turn in the conversation, but instead may decide for themselves what to say and how to say it.

Virtual Conversations provides a form of conversational interaction. The product plays a video clip of a person speaking, and then presents a small set of written responses. The user can read one of the presented responses into the microphone, and if the system recognizes the user's speech, the system will play another video clip based upon that response.

The MILT prototype language learning system also supports a form of conversational interaction. MILT displays an on-screen character in a room or other environment. The user can speak a series of commands for the system to carry out, such as commands to walk forward, pick up an object, etc. In response the character can either carry out the command or reply indicating that it did not understand the command.

Interactive games like Herr Kommissar 1.5—emulates dialog with a computer character, via text. The game includes some language instruction, but presumes that the learner already has some ability in the language. The language instruction that is included interrupts the flow of the game, unlike in natural conversational interaction. However, it may not effectively train learners at different levels of proficiency, nor provide a means to measure the success of the learning effort.

Other systems such as MRE, and SASO, and VECTOR emulate conversations. MRE and SASO support unstructured conversational interaction within a specific task domain. VECTOR may not support conversational interaction, but may instead have the user select from a set of presented responses at each stage in the dialog.

Cocinella simulates conversation in a foreign language, where at each stage the learner can read from a presented set of possible responses or else recall the expected responses from memory. Interactive lessons may be limited to opportunities to practice the specific phrases used in the game dialog.

These systems may not adequately train the user in the foreign language. They may not keep the attention of the user, result in the user being able to readily transfer his or her training to a real-life environment, be well suited to learners at different proficiency levels, aid the learner in improving his or her pronunciation, and/or induce the learner to fully participate in the learning process.

SUMMARY

A character programming and control system for programming and controlling a virtual character during a social simulation may include a behavior module configured to cause the virtual character to perform selected pre-programmed movements during the social simulation, an authoring tool configured to receive from an author a selection of a plurality of pre-programmed attitudes that the virtual character should exhibit during the social simulation, and a social puppet module configured to dictate which of the pre-programmed movements correspond to each of the selected attitudes.

A character programming method for programming the actions of a virtual character may include for each of a set of specified movements, programming into a computer system the changes that should occur to the appearance of the virtual character to effectuate the performance of the movement, and for each of a set of specified attitudes, programming into a computer system a selection of one or more of the set of specified movements that the virtual character should perform to exhibit the attitude.

A system for developing social skills of a user may include a user interface configured to receive non-verbal movement information indicative of movements of the user during participation in a social simulation, and an input manager module configured to receive the non-verbal movement information and to translate it into a communication that the movement indicated by the movement information objectively indicates under the norms of a culture.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

FIG. 12 is a screen displaying a learner progress report, focusing on nonverbal communication skills.

DETAILED DESCRIPTION OF ILLUSTRATIVE EMBODIMENTS

Figure 1:
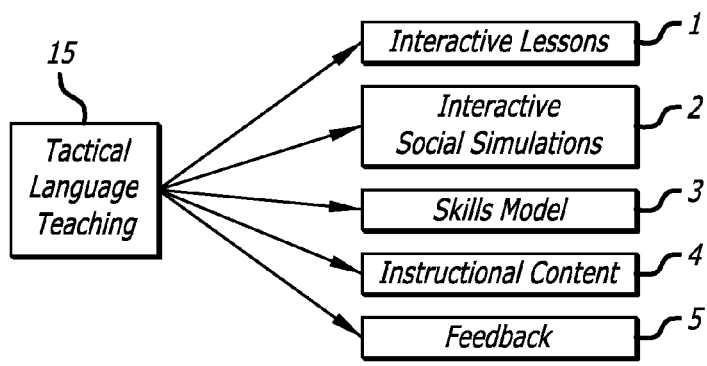
FIG. 1 shows components that may be involved in developing and implementing language teaching systems and methods.

As will be described in further detail below, using embodiments, users gradually learn communicative skills for interacting with people who speak foreign languages or belong to foreign cultures. Communicative skills may include spoken language skills in foreign languages. They may also include knowledge of nonverbal communication modalities such as hand gestures and nonverbal vocalizations, as well as social norms and rules of politeness and etiquette governing conversational interaction in various settings.

A foreign language teaching device and method may be provided. Any foreign language may be taught, such as Spanish, French, Arabic, Chinese, English, and Pashto.

A foreign language that a user wants to learn is called herein a "target language" A language which the user has mastery is called herein a "native language." A "user" may be a person learning a target language, or an instructor or trainer who is guiding, assisting, or facilitating a learning process. A "learner" is used herein to refer to users who are language learners, and an "instructor" is used herein to refer to users who are guiding or facilitating a learning process. A learner may be a child or an adult.

Learners may be beginner language learners, and may not have any prior language experience. Alternatively, a training device may be employed by learners with previous language training, including learners whom wish to conduct quick refresher training to maintain and improve their communicative skills.

Learners may learn through a combination of interactive lessons, social simulations, and/or other learning modalities. Interactive lessons may include structured presentations of vocabulary, phrases, and other specific communicative skills, as well as quizzes and exercises focusing on those skills. Social simulations may involve simulated conversations with interactive characters in a game or simulation context. Learners may receive continual feedback from a training system as they work with it. A teaching device may continually track a learner's mastery of each of a range of communicative skills, and may use this information to customize a learning experience.

Skills needed for particular tasks and situations may be taught. Vocabulary may be limited to what is required for specific situations, and may be gradually expanded through a series of increasingly challenging situations. Emphasis may be placed on oral proficiency.

Learners may practice their communication skills in a simulated village, where they may be required to develop rapport with local people, who in term may help them accomplish missions, such as post-war reconstruction. Other situations and environments may be modeled, such as restaurants, hotel reception desks, or medical offices.

Each learner may be accompanied by a virtual aide who can provide assistance and guidance if needed, tailored to each learner's individual skills. The aide may act as a virtual tutor as part of an intelligent tutoring system, giving the learner feedback on his performance. Learners may communicate via a multimodal interface, which may permit them to speak and choose gestures on behalf of their character in the simulation. The system may be configured to allow learners to communicate or say any of a range of things appropriate to that situation, rather than select from a fixed sets of choices.

Grammar may be introduced as needed to enable learners to generate and understand a sufficient variety of utterances to cope with novel situations. Nonverbal gestures (both "dos" and "don'ts") may be introduced, as well as cultural norms of etiquette and politeness, to help learners accomplish social interaction tasks successfully.

A collection of authoring tools may be included which support the rapid creation of new task-oriented language learning environments, thus making it easier to support less commonly taught languages.

FIG. 1 shows components that may be involved in developing and implementing language teaching systems and methods 15. The device may utilize a combination of interactive lessons 1 and interactive games that may include interactive social simulations 2 that may teach communicative skills and their use in particular situations, tasks, and/or job contexts. These may be configured to operate in a coordinated fashion, so that the skills that are taught in an interactive lesson is applied in an interactive game. The interactive social simulations 2 may provide concrete contexts for applying the communicative skills, which may aid in retention and transfer to use in the real world. For example, the simulation may place the learner outside of a café, where the learner may address the patrons and ask for directions. The concrete context of speaking to one of the patrons and observing his or her responses may make the experience highly memorable, and make it easier to apply what was learned in the real world.

Instructional content may be organized using a skills model 3. The skills model 3 may be a hierarchical taxonomy of skills to be learned. Language skills, cultural skills, and task skills may be subsumed in the skills model 3. Both interactive lesson content and interactive game content may be annotated according to the skills that they train. This may help to maintain the coordination between the interactive lessons 1 and interactive social simulations 2, to ensure that skills employed in the interactive social simulations 2 are taught in the interactive lessons 1.

Instructional content 4 may be authored based on the skills to be covered. Interactive lessons 1 and interactive social simulations 2 may configured to cover the target the skill set. As the instructional content 4 is authored, it may be annotated to indicate what skills it covers.

The system may be configured to continually process a learner's input as a learner interacts with computer-based software, so that it can provide continual feedback 5. The feedback 5 may be appropriate to the learning context, e.g., feedback 5 during the interactive social simulations 2 may be different from that in the interactive lessons 1. But in any case, the feedback 5 may give learners immediate indications of how well they are employing their communicative skills.

Figure 2:
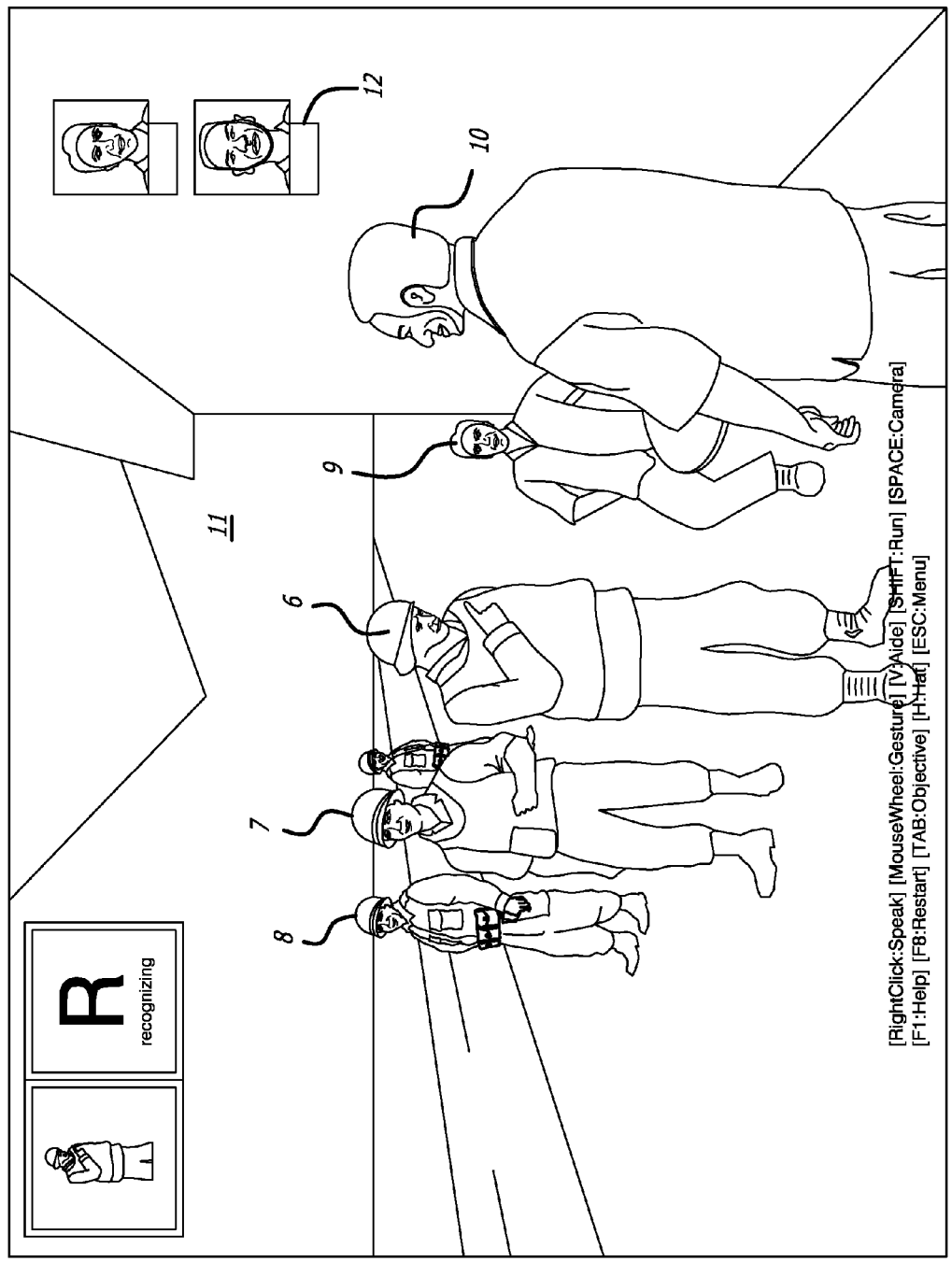
FIG. 2 is a screen displaying a stage in program that teaches Arabic and language and culture specific to Iraq and focused on needs of military personnel in civil affairs and peacekeeping operations.

FIG. 2 is a screen displaying a stage in program that teaches Arabic and language and culture specific to Iraq and focused on needs of military personnel in civil affairs and peacekeeping operations. It shows a social simulation in which a user's character 6 must make contact with a local leader in a district in order to plan a reconstruction operation. The user's character 6 may be in the center of the figure. Other characters in the scene 7, 8, 9 and 10 may respond to the user's speech and gesture. Success in the game may depend upon knowledge of local language and culture.

Figure 3:
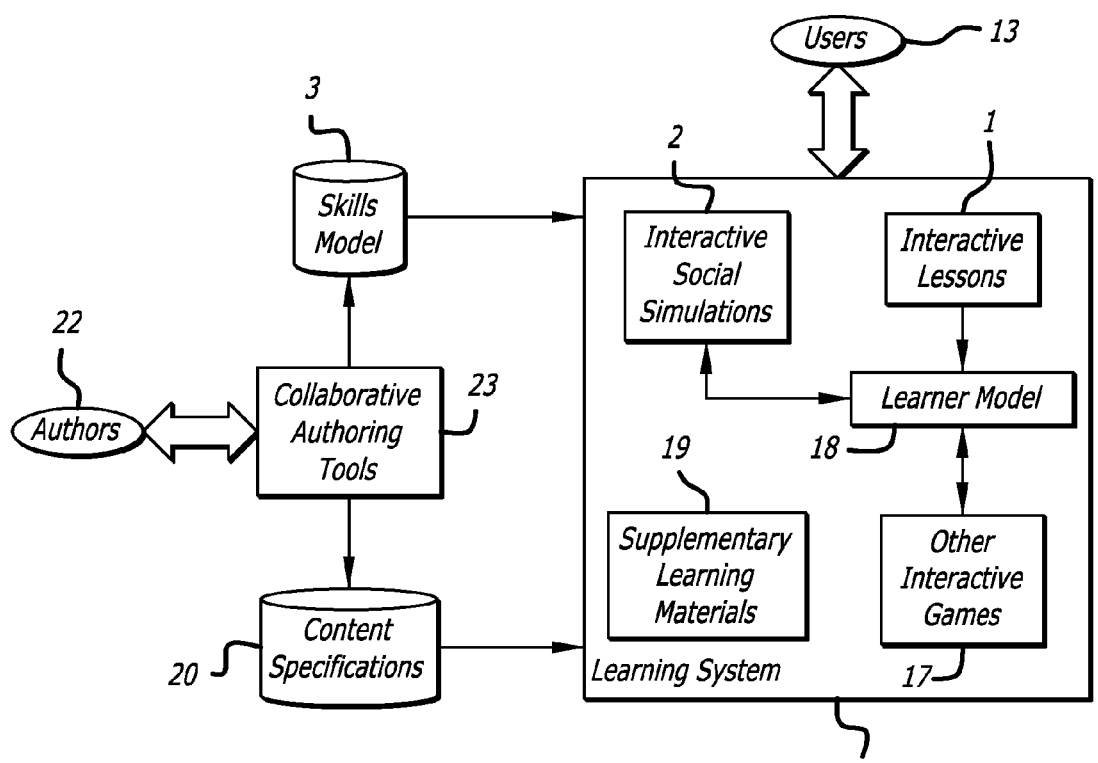
FIG. 3 shows a data flow diagram of components and data stores that may be used in developing and applying language teaching systems and methods, as well types of users that may interact with them.

FIG. 3 shows a data flow diagram of components and data stores that may be used in developing and applying language teaching systems and methods, as well types of users that may interact with them. Users 13 may be learners and/or instructors and may interact with a learning system 14 that may be implemented by a computer-based system. The learning system 14 may include interactive lessons 1, which may include interactive presentation materials and exercises configured to develop specific communicative skills. These may be delivered by a computer system. The learning system 14 may include interactive social simulations 2, which may be interactive games that simulate social interaction, and which may require a range of communicative skills to master. These may also be delivered by a computer system. These simulations may be used both to develop communication skills as well as to assess learner mastery of those skills. The learning system 14 may include other interactive games 17 that are configured to give learners practice in using communication skills. Each may access and update a learner model 18, which may include a computer-based record of a learner's level of proficiency, which may be tracked according categories of skills. This may provide ongoing assessment of learner performance. The learning system 14 may include supplementary learning materials 19 that may be available to a learner when he is not running a main computer-based learning system. They may be made available in print, electronic or in any other form.

All materials in the learning system 14 may be generated from a set of specifications of content specifications 20. The content specifications 20 may specify the structure, properties, and behavior of the interactive simulations in a user-friendly form so that these simulations can be authored, edited, and analyzed without knowledge of programming languages or program codes. The content specifications 20 may also be used in authoring, editing, and analyzing other aspects of the system, such as the interactive lesson 1 materials and the supplementary learning materials 19, to promote consistency between them.

The content specifications 20 may make reference to a skills model 3, as discussed above in connection with FIG. 1. Authors 22 may use collaborative authoring tools 23 to create and maintain the content specifications 20, making reference to the skills model 3. Reference to the skills model may help to ensure compatibility and consistency between the elements of the instructional content, e.g., to ensure that the skills required to use the interactive social simulations are covered in the interactive lessons, and that skills taught in the interactive lessons may be practiced in the interactive social simulations.

Figure 4:
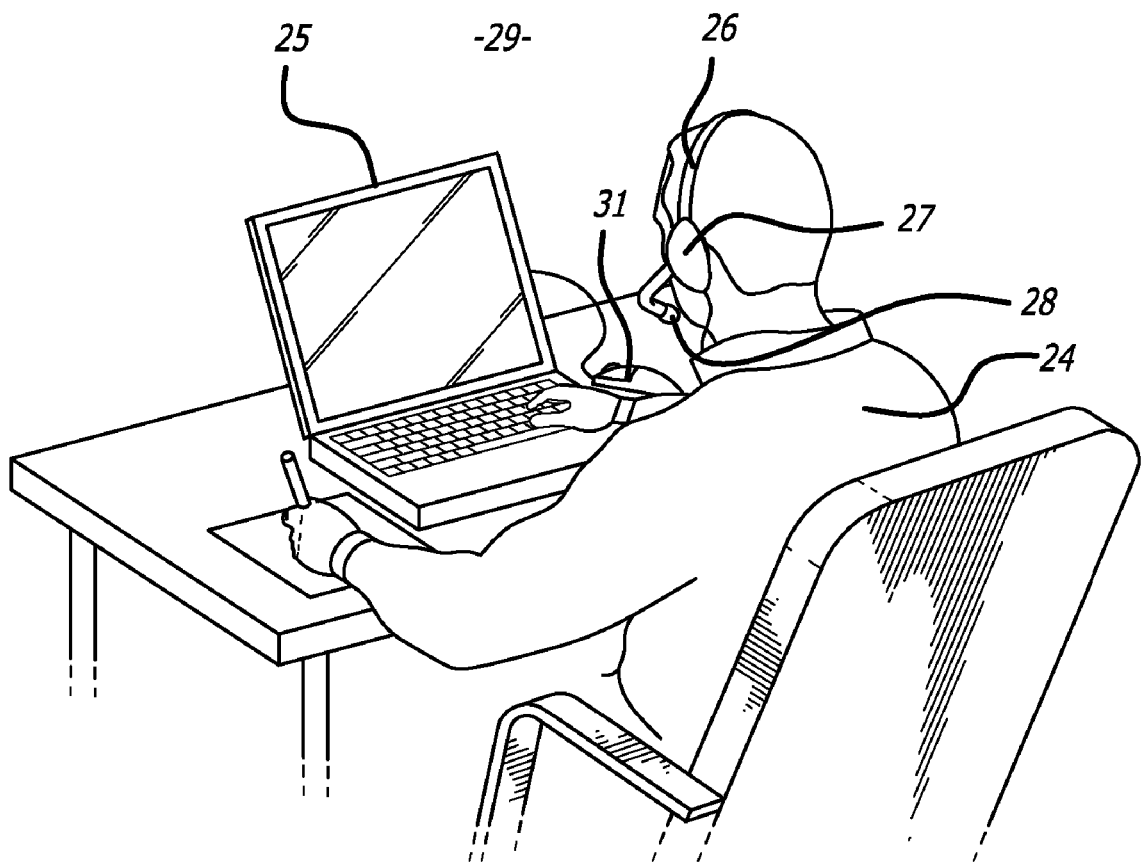
FIG. 4 illustrates a user interacting with language teaching systems and methods.

FIG. 4 illustrates a user 24 interacting with language teaching systems and methods. Some or all of the interactive social simulations 2, the interactive lessons 1, the learner model 18, the other interactive games 17, and supplementary learning materials 19 may be installed and running on a laptop computer 25. The laptop computer 25 may be equipped with a headset 26 having an earphone 27 and a microphone 28. The headset 26 may allow the user 24 to hear speech and other sounds generated by a program without disturbing other learners in the same room 29. The headset 26 may also enable the laptop computer 25 to receive speech from the user 24 without significant interference from others that may be in the same room 29. A keyboard 30 and computer mouse 31 may be used by the user 24 to help navigate through a program and control interaction. The computer may include a display 32 that presents the user with a view into a simulated game world (in the case of a social simulation) or a classroom environment (in the case of an interactive lesson).

Figure 5:
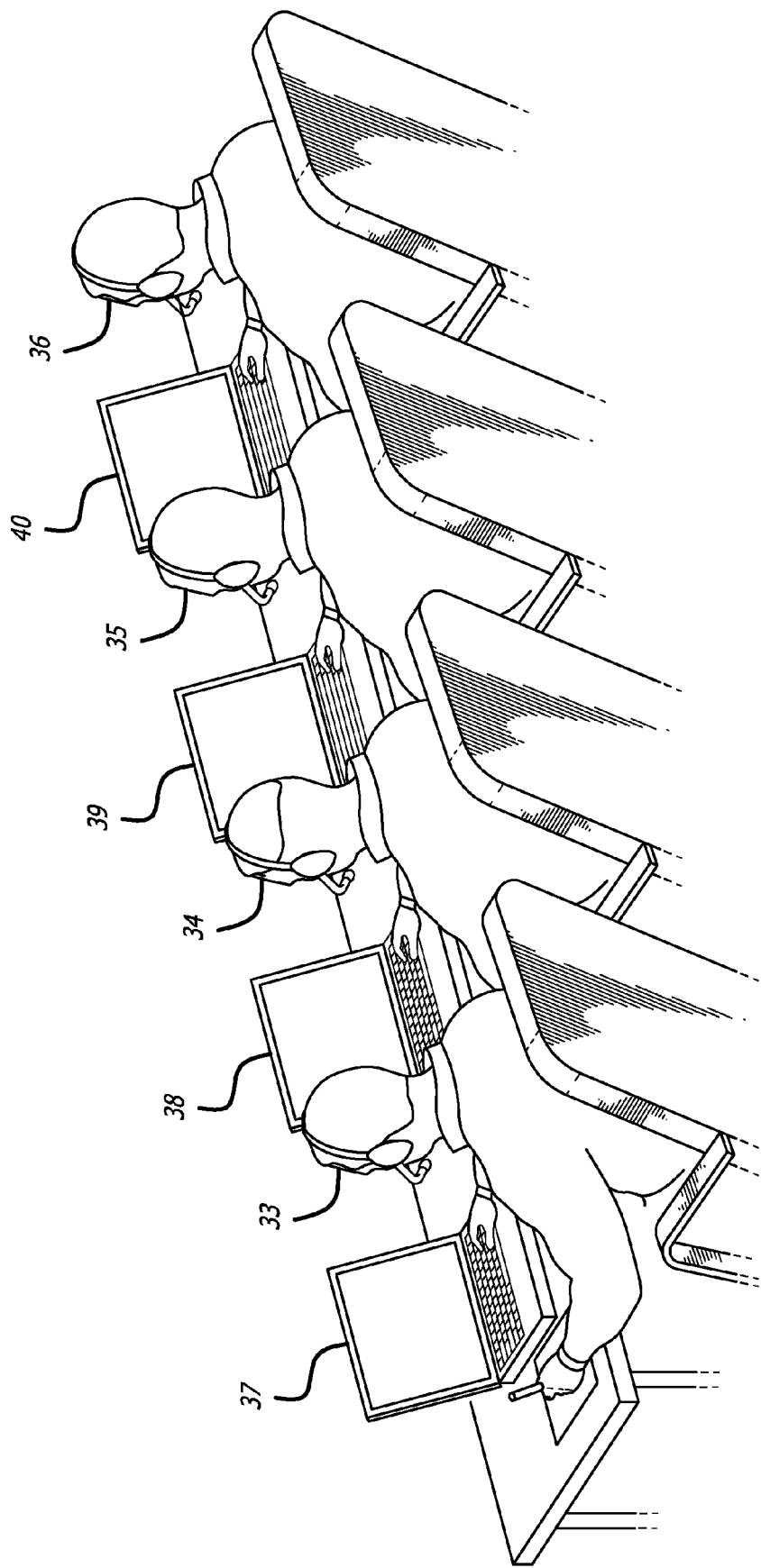
FIG. 5 illustrates users interacting with another embodiment of language teaching systems and methods.

FIG. 5 illustrates users interacting with another embodiment of language teaching systems and methods. Users 33, 34, 35 and 36 may be working on computer stations 37, 38, 39 & 40 that may be linked over a local area network (not shown). Learner models may be stored on a common server (not shown), and downloaded to a user's computer. This may enable a user to sit down at any computer on the network and receive a training experience appropriate to his learner profile and history.

This technology may be employed on any single or combination of computers and networked configurations. It may also be employed on other types of computing devices, such as game consoles.

Figure 6:
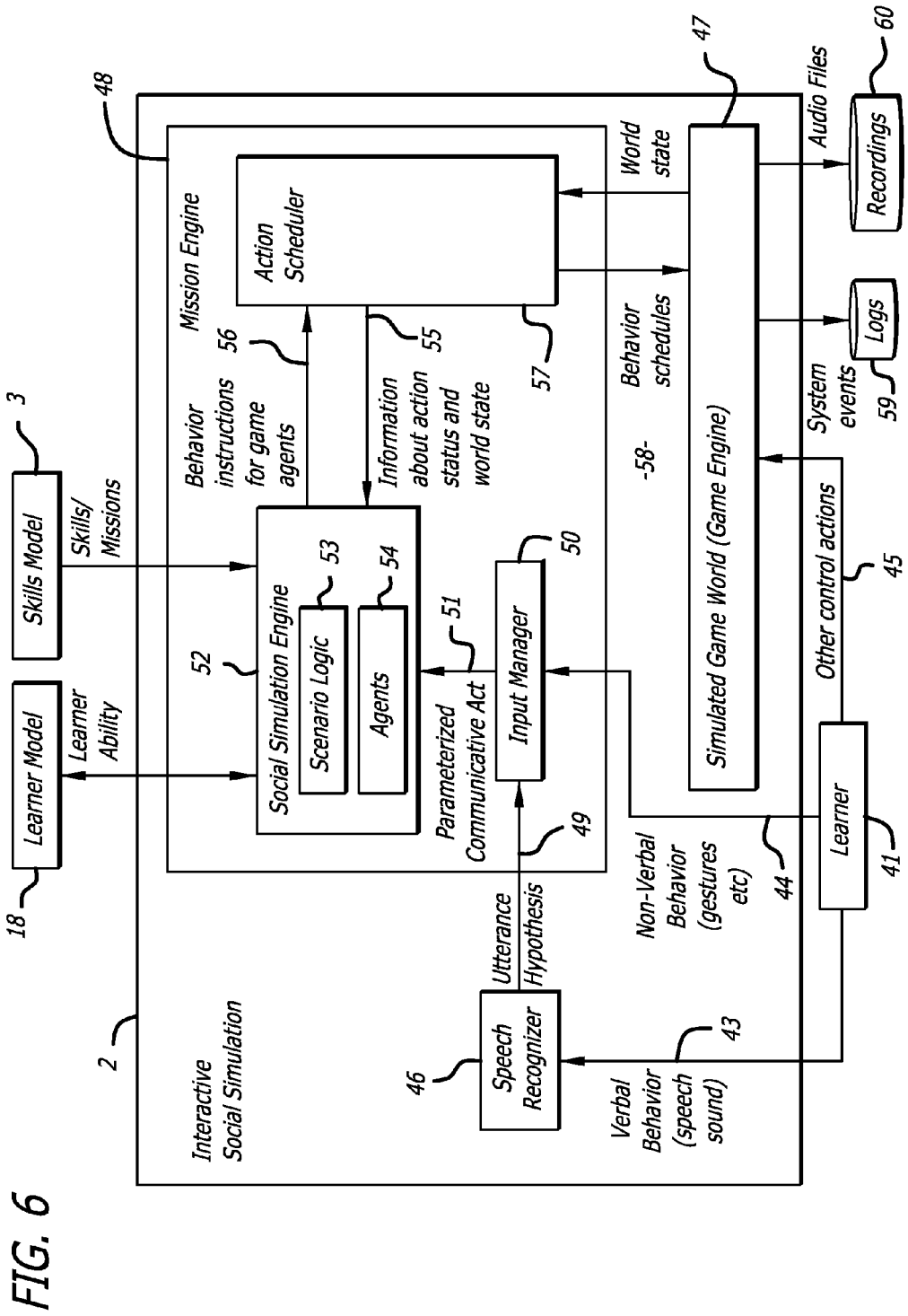
FIG. 6 is a data flow diagram illustrating processing components and data stores used in an interactive social simulation module, together with messages and data exchanged between them.

FIG. 6 is a data flow diagram illustrating processing components and data stores used in an interactive social simulation module, together with messages and data exchanged between them. In a social simulation, a user may play the role of an on-screen character, moving his/her character through the simulation, speaking on behalf of his character, and choosing gestures for his character. The user's character may then act in the simulation as directed by the user. Seeing one's own character on the screen may allow the user to see the chosen gestures in use, as well as practice choosing an appropriate degree of interpersonal distance when speaking to other characters. These cultural factors may vary from one culture to another.

A learner 41 may provide inputs to an interactive social simulation 2 by verbal behavior 43, nonverbal behavior 44, and/or other control actions 45 (e.g., to direct the learner's character to move in a particular direction in the game world). Not all types of input need be provided at all times. For example, nonverbal behavior may be omitted. Spoken inputs may also be used in place of control actions using a keyboard or mouse.

The verbal behavior 43 may take the form of speech. The learner 41 may speak into a microphone in the target foreign language. A speech recognizer 46 may then translate the input speech signal into an utterance hypothesis 49 in textual form. Alternatively, the verbal input may be entered by typing in text or selecting from a range of options via menus.

At the same or at a different time, the learner 41 may select nonverbal behavior 44 for his character, such as a hand gesture. A video camera and image processing capability may be provided to allow the learner 41 to act out the desired gesture. Alternatively, the learner 41 may select an appropriate gesture from a menu. The computer mouse 31 (shown in FIG. 4) may have a scroll wheel that may be used to select from among a set of available gestures. The interface may allow the learner 41 to select a gesture first, before speaking. In this case, the learner's on-screen character may act out the gesture while the learner 41 is speaking.

The social simulation may include a game engine 47. This may include a 3D simulation of a milieu in which the user's character interacts with other characters. This may be implemented using a game engine (e.g., Unreal Engine, or Torque engine). For example, one version of Tactical Iraqi may utilize the Unreal Tournament 2003 game, and another version may utilize the Unreal Engine 2.5. 2D simulations are also permitted, or a sequence of still images. They may provide contexts in which to apply the communicative skills. Other devices such as telephones may provide sound-only interaction.

The game engine may provide control actions such as moving, turning, etc. It may input control actions 45 from the learner 41. For example, the current implementation of Tactical Iraqi inputs arrow keys into the game engine, and uses these to move and turn the player character.

A mission engine module 48 may control the characters in the game world, and determine their responses to the actions of the learner 41 and to other characters. An input manager 50 may interpret an utterance hypothesis 49 and nonverbal behavior 44 of the learner 41, and produce a learner communicative act description 51 that may describe the content of the utterance hypothesis 49 and the meaning of the nonverbal behaviors 44. Communicative acts may be similar to speech acts as commonly defined in linguistics and philosophy of language, but may allow for communication to occur through nonverbal means, as well as through speech. A social simulation engine 52 may then determine how each character in the game should respond to the learner's action.

The social simulation engine 52 may provide high-level control of characters and overall action in the game. For example, it may be used to control or manage the interaction as an interactive pedagogical drama. See Marsella, S., Johnson, W. L., & LaBore, C. (2003). An interactive pedagogical drama for health interventions. In U. Hoppe and F. Verdejo (Eds.), Artificial Intelligence in Education: Shaping the Future of Learning through Intelligent Technologies, pp. 341-348. Amsterdam: IOS Press. The content of all of these publications are incorporated herein by reference. It may for example be used to create interactive social simulations to teach clinical skills to health professionals, such as clinical psychologists. A character could play the role of a patient or caregiver, and the user could then play the role of a clinical psychologist, selecting things to say to the virtual patient or caregiver that would help her to overcome her problems. Carmen's Bright IDEAS, an interactive health intervention described in Marsella et al. (2003), provides a model, in which a virtual caregiver, Carmen, converses with a virtual counselor, Gina. The social simulation engine could allow psychologist trainee play the role of Gina, trying to get Carmen to reflect on her problems and develop options for solving them. Projects like Carmen's Bright IDEAS have identified and catalogued a number of common phrases that psychologists use in such consultations, which could be incorporated into the dialog of the social simulation. Social skills such as developing and maintaining rapport and interpreting nonverbal cues and body language may be relevant for such applications, and may be incorporated into the skills model 3 and learner model 18, just as they may be incorporated into language training applications (e.g., see FIG. 12).

The social simulation engine 52 may have scenario logic 53 and agents 54. The scenario logic 53 may define what events occur in the simulated world, in response to other events or world states. The agents 54 may determine what actions non-player characters in the game perform.

Multiple non-player characters may be supported. This may allow the learner 41 to practice participating in complex multi-way conversations. Having additional characters may allow the learner 41 to see how other characters in the environment are reacting to current conversation; those characters may even jump into the conversation if they object to what the learner 41 or other characters are saying. This can result in a social simulation with a high degree of realism.

In order to make these decisions, the social simulation engine 52 may receive notifications of the current state of the simulated world as well as the status of previous actions (whether they have been completed or not) 55. Based upon this information, it may select behavior instructions 56 for each character to perform. An action scheduler 57 may implement these actions as a sequence of animations for the game characters to carry out. The game engine 47 may utilize video clips, in which case the action scheduler 57 may select video clips to play that closely match the behavior instructions. The game medium may only use audio, in which case the action scheduler 57 may select or compose a sound sequence that satisfies the behavior instructions 56. The action scheduler 57 may also monitor the state of the game world and of actions in progress, and pass this information to the social simulation engine 52.

As the learner 41 interacts with the social simulation engine 52, he may save data to event logs 59. The event logs 59 may record actions on the part of the learner 41, as well responses by characters and/or game world objects. The system also may save recordings 60 of the learner's speech or language as he/she interacts with the game. The recordings 60 may be used to evaluate the learner's performance, as well as train the speech recognizer 46 to improve recognition accuracy.

Figure 7:
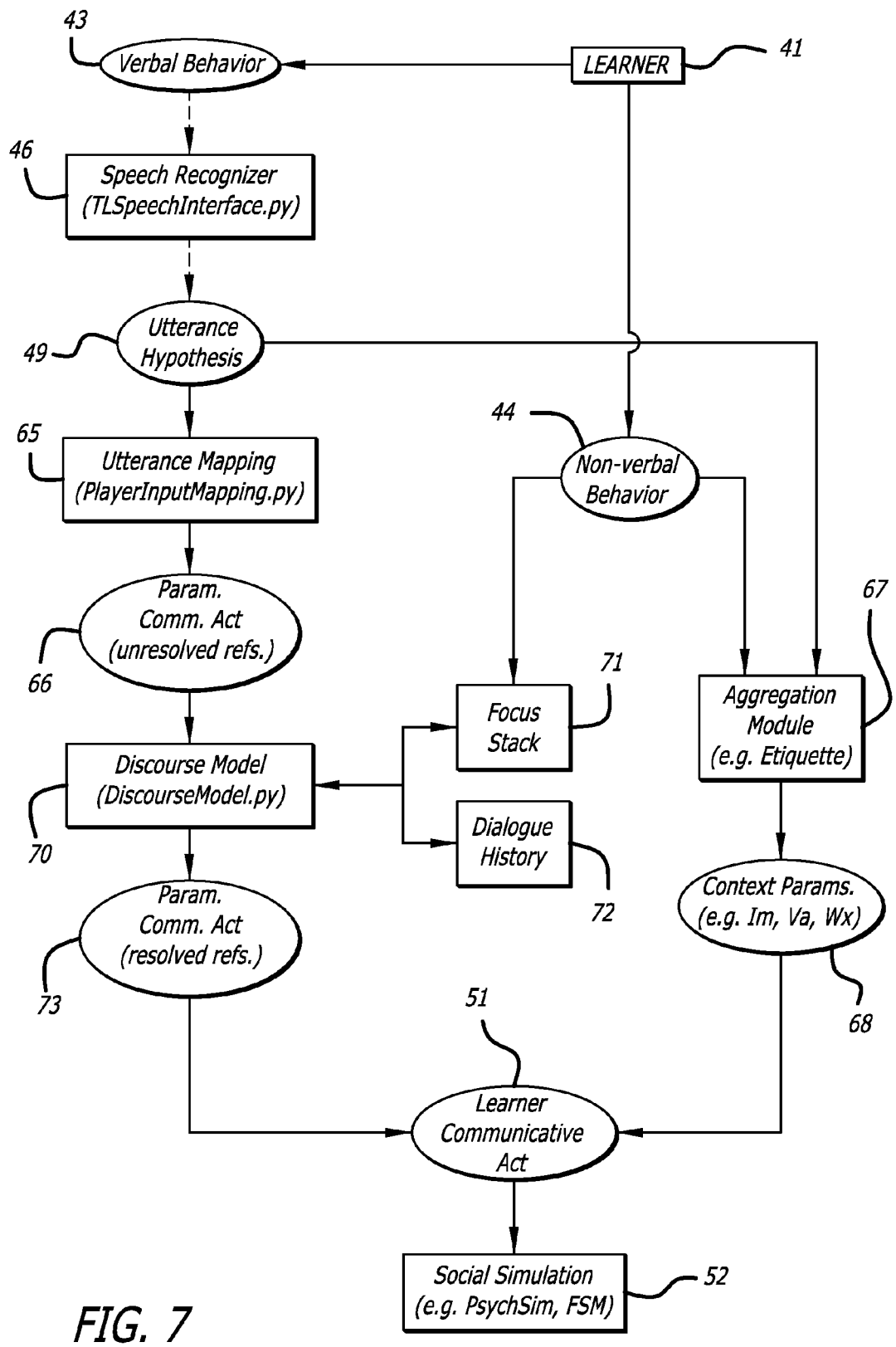
FIG. 7 is a data flow diagram illustrating processing components used in an input manager module, within an interactive social simulation module, together with data exchanged between module components.

FIG. 7 is a data flow diagram illustrating processing components used in an input manager module, within an interactive social simulation module, together with data exchanged between module components. The input manager may convert verbal behavior 43 and nonverbal behavior 44 input from a learner 41 into a form that the social simulation engine can understand. The social simulation engine may then generate an appropriate response for one or more of the characters it controls.

When learners communicate with on-screen characters, they may provide audio input, but they also may provide nonverbal information through a choice of gesture or the state of their own on-screen character (e.g., wearing sunglasses). The audio input may be passed through an speech recognizer 46 that may output an utterance hypothesis 49 in textual form. An utterance mapping function 65 may map the utterance hypothesis 49 into a parameterized communicative act 66. The parameterized communicative act 66 may identify the semantic category of the communication, e.g., where it is a greeting, a response to a greeting, an enquiry, an offer of information, etc. At this stage in the process the communicative act description may not capture all the differences between variants of the same speech act—e.g., differences in degree of informality (e.g., "How do you do" vs. "Hey there"), or differences in context (e.g., "Good morning" vs. "Good evening"). It may disregard variants in language that do not significantly change the communicative intent of the utterance, e.g., "What is you name?" vs. "Tell me your name." It also may fail to capture the meaning of associated nonverbal information such as wearing sunglasses (which break eye contact, and therefore are considered rude in some cultures) and nonverbal gestures (bowing, placing your hand over your heart, and other emblematic gestures). Further processing may therefore be performed on the parameterized communicative act 66 to add parameters which may capture some of these other aspects of the meaning of the utterance.

The utterance hypothesis 49 and nonverbal behavior 44 may therefore be passed through an aggregation module 67, which may return context parameters 68 based on an interpretation of the utterance surface form in the given nonverbal and social context—this is where differences between alternative surface forms of a speech act may be captured. These parameters may be added to the learner communicative act description 51.

Utterances may contain references that are meaningless without proper context (e.g., when using pronouns) and these references may need to be resolved. Before being combined with the context parameters, the parameterized communicative act 66 may be passed into a discourse model 70, which may maintain a focus stack 71 and a dialogue history 72. The focus stack 71 may maintain a list of objects and topics referred to during the course of the conversation. These references may have been made verbally or nonverbally. For example, if the learner 63 points at an object in the simulated world, the target object may get added to the focus stack 71. The dialogue history 72 may contain a list of all earlier speech acts in the current conversation. The discourse model 70 may use these data structures as context for resolving any references in the current communicative act and update them in preparation for dealing with future communicative acts. For example, if the learner says "Where is he?" the discourse model 70 may refer to the focus stack 71 to determine which male person was most recently discussed. The communicative act with resolved references 73 and context parameters 68 may then be finally combined to yield the complete learner communicative act description 51, which may represent the unambiguous communicative intent that is sent to the social simulation engine 52.

The Input Manager may used in a variety of interactive games and simulations that may benefit from multimodal input. For example, role playing games such as Everquest allow users to control an animated character and communicate with other characters. The Input Manager may permit such applications to input a combination of gesture, and interpret them in a consistent way. It may allow the application developer to increase the repertoire of nonverbal communicative behaviors that the user may enter (e.g., hand waving, bowing, handshakes, etc.) and interpret them as instances of more general categories of communicative acts (greetings, acknowledgments, etc.). It may also allow the application to recognize and interpret in a consistent way those aspects of the user's utterances that pertain to social interaction and rapport, such as expressions of politeness and mitigation of face threat (see P. Brown & S. C. Levinson (1987). Politeness: Some Universals in Language Usage. New York: Cambridge University Press. The content of this publication is incorporated herein by reference). This in term may enhance the ability of the social simulation to model social interaction between the users and the computer characters in a variety of application areas.

Figure 8:
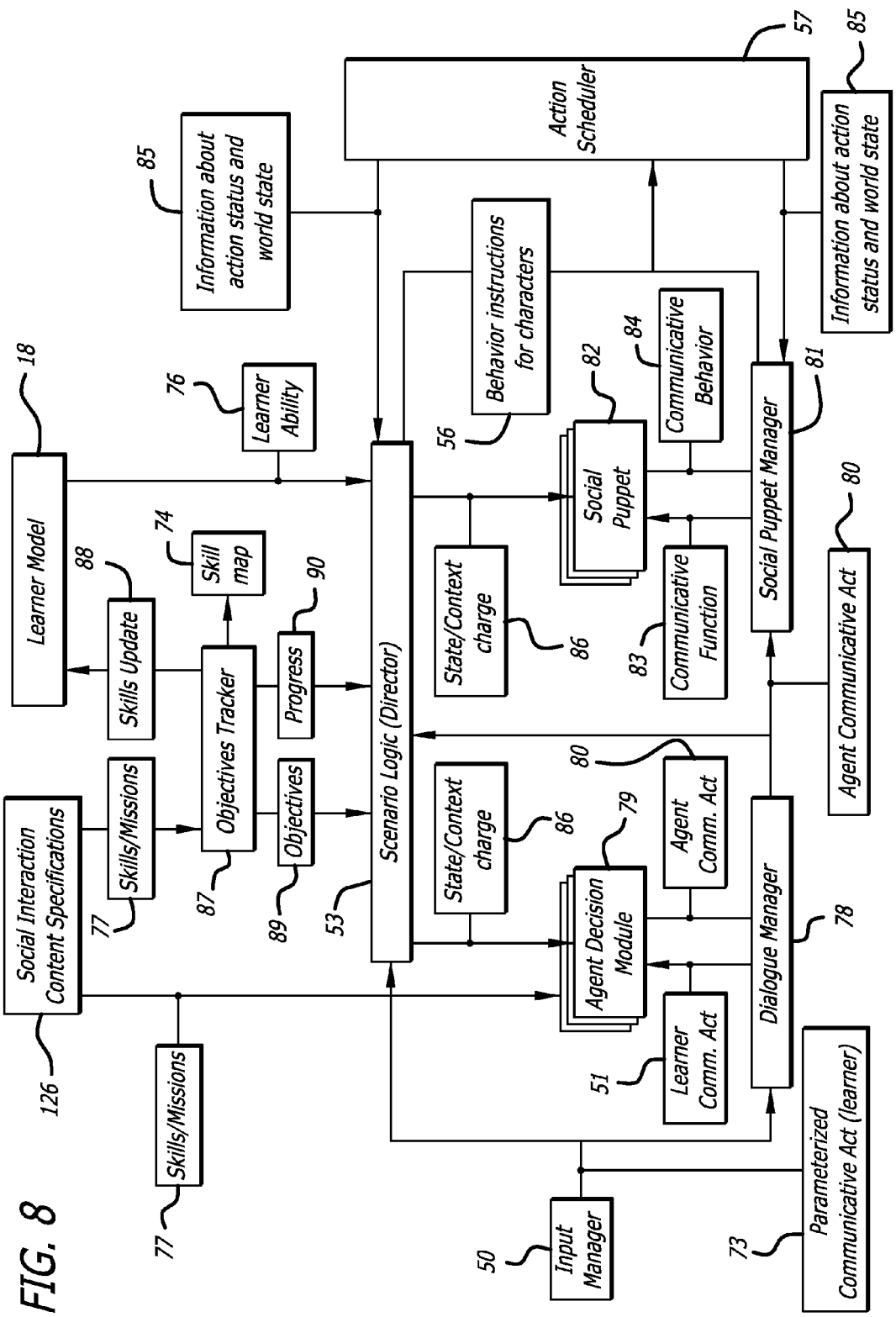
FIG. 8 is a data flow diagram illustrating processing components used in a social simulation engine, within an interactive social simulation module, together with data exchanged between module components.

FIG. 8 is a data flow diagram illustrating processing components used in a social simulation engine, within an interactive social simulation module, together with data exchanged between module components. The social simulation engine may be initialized with a summary of the current level of learner ability 76 and the current skills/mission 77. The learner ability 76 may be retrieved from the learner model 18, and the skills/missions 77 may be retrieved from social interaction content specifications 126 that may describe elements of the characters in the social simulation and their behavior. The learner ability 76 may include the learner's level of mastery of individual skills, and game parameters that determine the level of difficulty of game play, such as whether the learner is a beginner or an experienced player, and whether or not the player should be provided with assistance such as subtitles. The skills/missions 77 description may include a description of the initial state of the scene, the task objectives 89 to be completed in the scene, and/or the skills needed to complete mission objectives.

The learner ability 76 and skills/missions 77 parameters may be processed by scenario logic 53 which may serve the role of a director that sets up and manages the scene. This scenario logic 53 may initialize the state of each character (also known as an agent) in the scene. This may include initializing the mental state of each character, e.g., the character's initial level of trust toward the learner. The scenario logic 53 may also select a personality profile for each character, which may determine how the character will react to actions by the learner and other characters. These parameters may depend upon the learner's level of ability. In particular, characters may be directed to be relatively tolerant of mistakes made by beginner learners, but relatively intolerant of mistakes by advanced players. Likewise, the characters may be directed to allow the learner an indefinite amount of response time, or to react if the learner fails to respond within an amount of time typical for spoken conversation.

During execution of the social simulation, learner communicative acts description 51 representing learner speech and gesture may get processed by a dialogue manager 78. The dialogue manager 78 may send these acts to an agent decision module 79 that may decide how nearby agents respond. A single decision module may make the decisions for all the nearby agents, or alternatively there may be a separate decision module instance for each agent.

To determine which agents can respond, the scenario logic 53 may place agents into conversation groups at creation time. The learner may then select an agent to speak to, e.g., by walking up to and facing a particular agent. The game engine may use a special indicator such as an arrow or highlighting to indicate which agent has been selected. As an example, in FIG. 2 the learner 41 has selected the character 10 on the right to speak to, and this is indicated by the arrow 11 floating over his head. The learner may select a different agent to speak to by turning in a different direction, or by leaving one agent and approaching another. The composition of the conversation groups may also change when an agent leaves a conversation group and approaches another conversation group.

When the learner 41 selects an agent to speak to, all agents belonging to the same conversation group may get a chance to respond. When the dialogue manager 78 receives the responses back from the agent decision module 79, it may order them according to the relevance to the learners original input (e.g. a direct answer to the learner's question is ranked higher than the start of a new topic) and in that sequence may pass the communicative acts from the agents 80 to a social puppet manager 81.

The dialogue manager 78 may also pass information about the updated agent states to the game engine 47 where it can be displayed in an interface element such as the graphical trust bars under the agents' corresponding portrait 12. Although PsychSim multi-agent system (see S. Marsella, D. V. Pynadath, & S. Read (2004). Agent-based modeling of social interactions and influence. In Proceedings of the International Conference on Cognitive Modeling, pp. 243-249. The content of this publication is incorporated herein by reference.) has been used as the decision module 79 in one embodiment, other implementations can be plugged in depending on the depth of reasoning required. For example, a customized finite state machine may be used in another embodiment.

The social simulation may be organized into a set of scenes or situations. For example, in one scene a group of agents might be sitting at a table in a café; in another situation an agent playing the role of policeman might be standing in a traffic police kiosk; in yet another scene an agent playing the role of sheikh might be sitting in his living room with his family. In each scene or situation each agent may have a repertoire of communicative acts available to it, appropriate to that scene. Some communicative acts are generic and applicable to a wide range of agents and situations. This might include greetings such as "Hello," or "How are you?" or "My name is <agent's name>" (if English is the target language). Other communicative acts may be appropriate only to a specific situation, such as "I understand you are a member of a big tribe," or "Is this Jassim il-Wardi's house?" These may be supplemented by generic phrases to employ when the agent didn't understand another agent's or user's communicative act, such as "Okay" or "What did you say?" or "Sorry, I don't speak English." Each agent also may have a repertoire of communicative acts that it is prepared to respond to, including generic ones such as "What is your name?" or "Who is the leader in this district?"

The designer of the scene may provide each agent with a repertoire of communicative acts that it can perform and a repertoire of communicative acts that it can respond to, appropriate to that scene or situation. Generally the number of types of parameterized communicative acts may be much less than the number of concrete utterances. For example, "Hello!" and "Hey there!" may both be considered instances of greet speech acts. "I'm Mike" and "My name is Mike" are both instances of inform speech acts, where the object of the inform act is the agent's name. Agents may respond to similar speech acts in similar ways, reducing the complexity of dialog management for each agent.

These similarities may also be exploited to reduce the range of utterances which the speech recognizer 46 (FIG. 7) must recognize. For example, it may not very important for the speech recognizer 46 to discriminate between "I'm Mike" and "My name is Mike", since the agent's response may be the same to both. Reducing the number of utterances that must be recognized may simplify the construction and execution of agents, while ensuring that the agent's dialog still appears robust and believable from the user's perspective.

Other characteristics of the scene and of the learning content may be exploited to reduce the complexity of the agents while retaining the impression of robust dialog. If it is expected that the user is a beginner language learner, one can limit the range of communicative acts that the agents are prepared to respond to, under the assumption that the learners will know how to say only a limited range of utterances. For some minor characters the repertoire may be quite small, for example an agent playing the role of waiter may have little to say other than "Please take a seat, I will be with you shortly." Limiting the range of communicative acts makes it easy to populate a game world with large numbers of simple agents.

For agents with more significant roles, the decision module 79 may choose appropriate communicative act responses to a wide range of input utterances. The dialog may be organized as a set of utterance-response pairs, or "beats." The decision module may then manage the dialog by determining which beats are appropriate at a given point in the dialog. Some utterance-response pairs may be generically appropriate at any time during the conversation. For example, if the input utterance is "What's your name?" then the agent's response might be "My name is Mike" regardless of when the user asks the question. Some utterance-response pairs may be appropriate only after certain events have occurred, or when certain states hold. For example, if the user asks "Where is the leader of this district?" the agent might respond with the name only if the agent's level of trust of the user is sufficiently high. The decision module 79 may therefore keep track of states or context changes 86 in order to determine which responses are appropriate in the current situation. The selection of appropriate responses may then be performed via finite-state machines whose transitions are may be conditioned on state or context. They may also be chosen using production rules that are conditioned on the current state. Other dialogue modeling methods such as partially observable Markov decision processes may be used.

Figure 9:
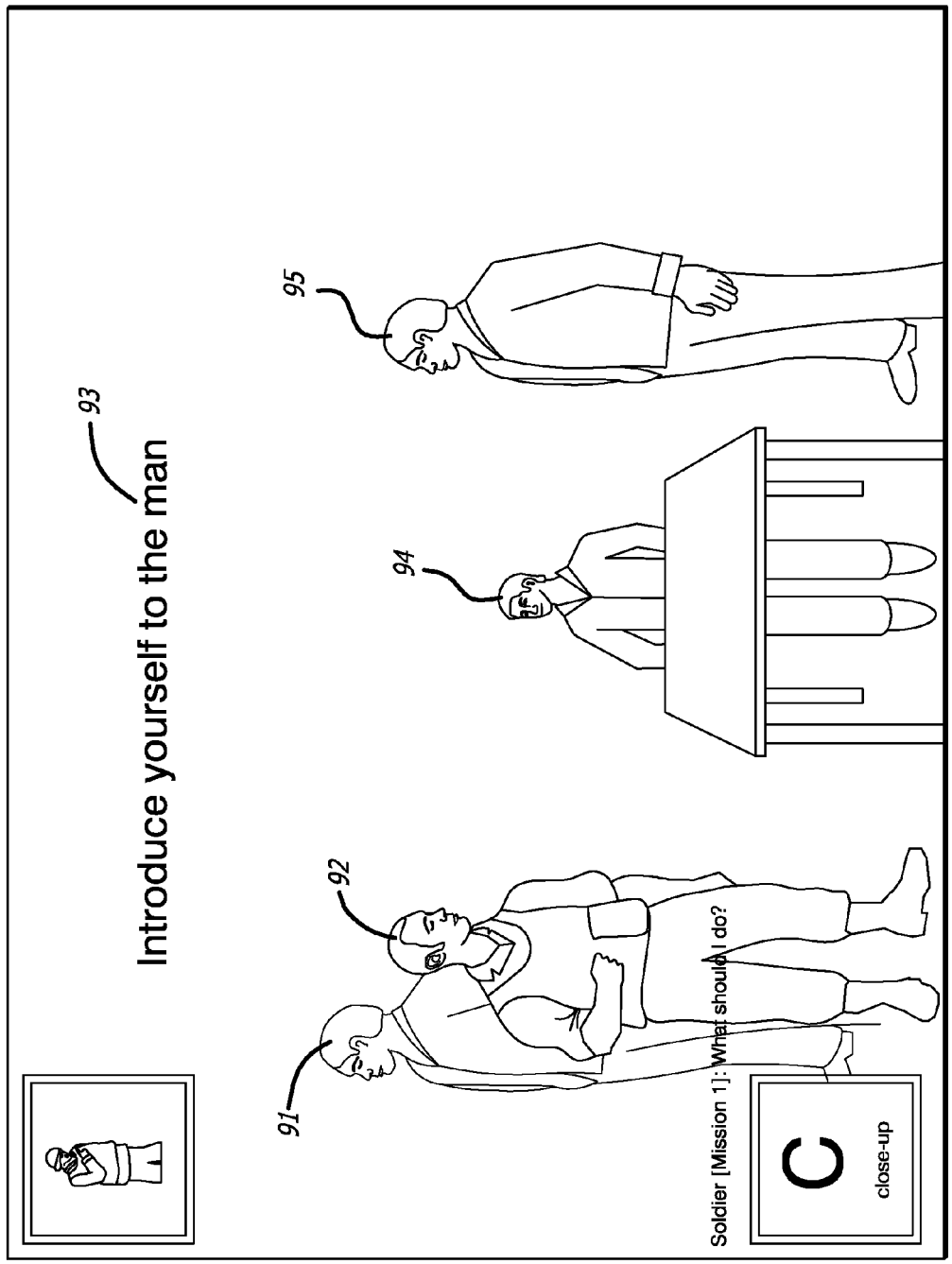
FIG. 9 is a screen displaying a virtual aide (a component of a social simulation module) advising learner on what action to perform.

FIG. 9 is a screen displaying a virtual aide (a component of a social simulation module) advising learner on what action to perform. The social simulation game may include a special agent: a virtual aide 91, which may provide help and assistance to a learner 41 (FIG. 7) as he proceeds through the game. The virtual aide 91 may accompany the learner's character 92 as a companion or team member. The virtual aide 91 may provide the learner 41 with advice as to what to do, as in FIG. 9, where the virtual aide 91 is suggesting that the learner 41 introduce himself to one of the townspeople, as reflected in the statement 93 "Introduce yourself to the man" in the native language of the learner 41. The virtual aide 91 may also translate for the learner 41 if he or she is having difficulty understanding what a game character is saying. The virtual aide 91 may also play a role within the game, responding to actions of other characters 94 or 95 or of the learner 41.

The behavior of the virtual aide 91 may be driven from two agent models, one representing the aide's own role in the game and one representing the learner's role in the game. Based on the model of the aide's own role in the game, the decision module 79 (FIG. 8) can choose actions for the virtual aide 91 to perform consistent with the aide's role in the game.

Based on the model of the user's role in the game, the decision module can provide the learner 41 with options of what action to take in the game. The decision module 79 could choose a single action to recommend, which may be the action that the decision module 79 would choose itself if it were controlling the user's character. Alternatively, the decision module 79 could present the user with a list of all communicative acts in the repertoire that are permissible in the current state of the dialog.

As shown in FIG. 8, the social puppet manager 81 may be responsible for coordinating the verbal and nonverbal conduct of agents in conversational groups according to a certain set of behavior rules. Each agent 54 (FIG. 6) may have a corresponding social puppet 82 in the social puppet manager 81. The social puppet manager 81 may choose a communicative function 83 for each agent character to perform, and the social puppet 82 may then determine what communicative behaviors 84 to perform to realize the communicative function 83. These communicative behaviors 84 may then be passed to the action scheduler 57 for execution, which may in turn cause the animated body of the character to perform a combination of body movements in synchronization. Communicative functions may be signaled by other display techniques, such as displaying an image of one character attending to and reacting to the communication of another character (a "reaction shot").

Figure 10:
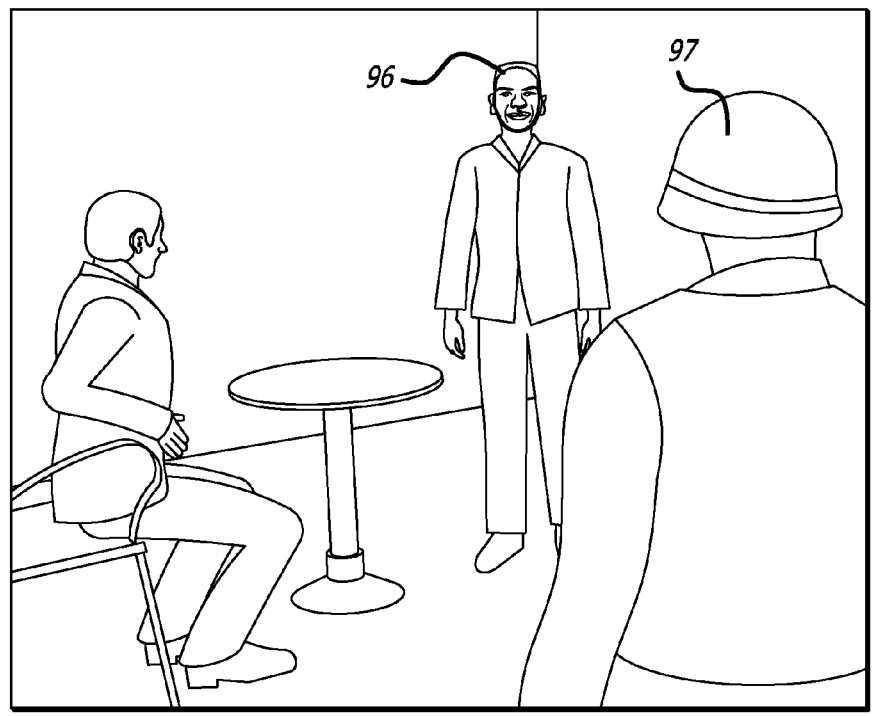
FIGS. 10 and 11 are screens displaying characters in a social simulation engaged in communicative behaviors.
Figure 11:
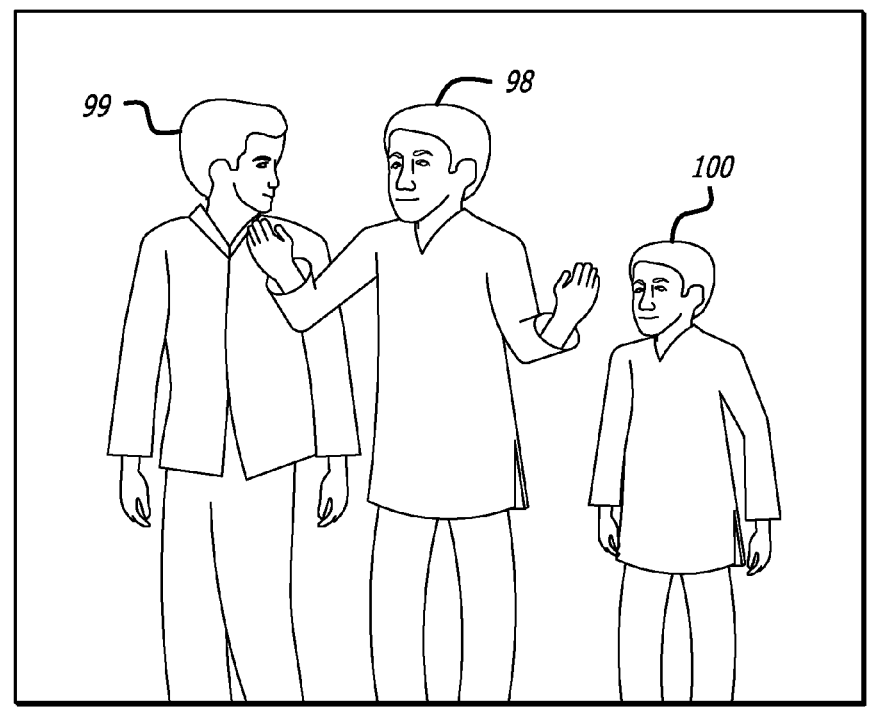

FIGS. 10 and 11 are screens displaying characters in a social simulation engaged in communicative behaviors. In FIG. 10, the character 96 signals the communicative function of engaging in the conversation. He does this by performing the communicative behaviors of standing up and facing the player character 97. In FIG. 11, the character 98 performs the communicative function of taking the conversational turn, and characters 99 and 100 perform the communicative function of listening to the character 98. The communicative function of taking the turn is realized by speaking in coordination with gestures such as hand gestures. The communicative function of listening to the speaker is realized by facing and gazing at the speaker.

Many communicative behaviors can be performed by characters in a range of different situations, but it is the dialog context that may give them communicative function. For example, a character may stand up for various reasons, and may face and gaze at a variety of objects. The social puppets 82 may utilize the character bodies' repertoire of behaviors to perform actions which the user will interpret as communicative in nature.

Returning to FIG. 8, when the dialogue manager 78 tells the social puppet manager 81 that an agent 54 wishes to speak, the social puppet manager 81 may place that agent's puppet on a queue for the conversation floor, asking that puppet to perform the communicative function of "turn request" which the puppet may map to a nonverbal behavior. When no one is speaking, the puppet at the top of the floor queue gets to perform a "take turn" communicative function and then deliver what it has to say. Whenever a new agent speaks, including the learner, all puppets in the group may be told to perform their "listen to speaker" communicative function. When a speaker finishes speaking, as indicated by an action status event from the action scheduler 57, the next speaker on the floor queue, or if the queue is empty the most likely next speaker (typically the agent who spoke before the current speaker), may get the attention from all the puppets in the group. In this manner, the social puppet manager may coordinate the behavior of several different puppets, even if only one of them is carrying out the response dictated by the decision module 79.

Social puppets 82 may also generate a nonverbal reaction to events other than speech. This may be possible if information about the status of various actions and the state of the game world 85 is being routed directly to the social puppet manager 81. The social puppet manager 81 may look to see if those events have any communicative function, and if so, asks the social puppets 82 to react according to their social rules. For instance, if the learner approaches a group of puppets, they need to demonstrate a reaction that reveals something about their willingness to interact. The approach event triggers a reaction rule that generates visible behavior, taking into account the context that the scenario logic 53 has supplied.

At any stage in the agent behavior generation, the scenario logic 53 may intervene and implement puppet behavior or changes in the game world that are tailored to the specific scene. The scenario logic 53 may affect the game world directly, or it may influence agents and puppets by changing their contextual parameters at run-time (such as affecting agent trust).

During the course of the game an objectives tracker 87 (FIG. 8) may monitor the progress 90 of the learner. The scenario logic 53 may note when a message passes through the system indicating that an event occurs which achieves a particular game objective. The objectives tracker 87 notes this, and may provide the learner with a display indicating which objectives have been met so far.

As the learner engages in the social simulation, the objectives tracker 87 may note when the learner employs particular skills, and use this information to update 88 the learner model 18, updating its estimates that those skills have been mastered. The social simulation may then make available to the learner a skill map 74 which summarizes the skills required to play the game scene successfully, and the learner's current degree of mastery of those skills. This may employ learner model update mechanisms similar to those used in the interactive lessons, as well as the skills model, both of which are described in further detail below.

FIG. 12 illustrates how the learner model can be made to reflect the skills which the learner has employed in the social simulation. The illustration shows a progress report that may be generated a the learner model in an Arabic language and culture trainer employing the invention, showing in detail a category of skills called Communication skills 61. The subcategory of the communication category may include various social skills related to face-to-face communication, such as gestures that are characteristic of the culture, using proper gestures of respect, and the importance of eye contact in the target culture. In this example an understanding of eye contact 62 is rated at 10.0 out of a possible 10.0. This may reflect the fact that the learner consistently directs his character in the simulation to remove his sunglasses before introducing himself to Arab characters.

The scenario logic 53 may terminate the mission with a success debriefing if all game objectives have been met and with a failure debriefing if it detects a failure condition. Further summaries of learner performance during the scene may be provided at that time.

Figure 13:
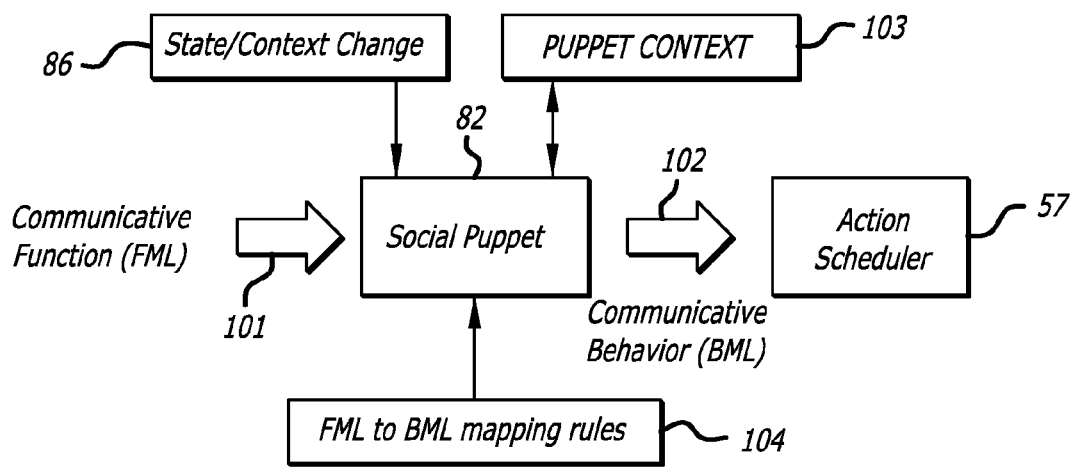
FIG. 13 is a data flow diagram illustrating a flow of information and data stores employed in a social puppet module, which may be an element of a social simulation module.

FIG. 13 is a data flow diagram illustrating a flow of information and data stores employed in a social puppet module, which may be an element of a social simulation module. The intended communicative functions 101 may be specified in an eXtensible Markup Language (XML) format. More information about this may be seen in H. Williamson (2001), XML: The Complete Reference, Osborne Press, the entire content of which is incorporated herein by reference.

The communicative function 83 shown in FIG. 8 description may identify basic semantic units associated with the communicative event (e.g., actions, people, objects, and events). It may allow the annotation of these units with properties that further describe the communicative function such as expressive, affective, discursive, epistemic, or pragmatic functions. The description may name the agents that participate in the communicative event and identify their roles in the communication, which may include speaker, addressee, listener, and overhearer. The description may describe how each speaking turn fits into the overall dialog: how the agent intends to bring about the start of the turn (e.g., by requesting it) and how the agent intends to relinquish the turn once done communicating (yielding the turn to everyone, giving it to the addressee or actually keeping it in case the agent wishes to continue speaking. The description may identify a topic of discussion, and if it constitutes a topic shift, it may indicate whether the topic shift is only a digression or a complete change to a new topic. The description may also identify the type of communicative goal that is intended (also known as the type of performative).

As shown in FIG. 13, the communicative function 101 description may be specified using Functional Markup Language (FML) 1. See H. Vilhjálmsson and S. C. Marsella (2005). Social Performance Framework. Presented at Workshop on Modular Construction of Human-Like Intelligence, 20$^{th}$ National AAAI Conf. on Artificial Intelligence, AAAI Press. The entire content of these references are incorporated herein by reference. Other specification languages that capture the elements of communicative function descriptions may also be used.

A social puppet 82 may generate a communicative behavior description 102 that realizes the communicative function 101. The communicative behavior description 102 may specify a set of individual movements and actions, which may include: (1) head movements, (2) movement of the torso, (3) facial expressions or other movements of facial muscles, (4) gaze actions which may involve coordinated movement of the eyes, neck, and head direction, indicating where the character is looking, (5) movements of the legs and feet, (6) gestures, involving coordinated movement of arms and hands, (7) speech, which may include verbal and paraverbal behavior, and/or (8) lip movements. These communicative behavior descriptions 102 may be specified in Behavioral Markup Language (BML), or they may be realized in some other embodied conversational agent behavior description language such as MURML or ASL. See S. Kopp, B. Krenn, S. Marsella, A. Marshall, C. Pelachaud, H. Pirker, K. Thórisson, H. Vilhjálmsson (2006). Towards a common framework for multimodal generation in ECAs: The Behavior Markup Language. In 2006 Conference on Intelligent Virtual Agents, in press. The entire content of these references are incorporated herein by reference.

The translation from communicative functions 101 to communicative behaviors descriptions 102 may depend upon the agent's context. A puppet context 103 may record the particular set of features in the world and agent state which are relevant for selecting appropriate behaviors. The puppet context 103 may include information about the agent's attitude (e.g., content, neutral, annoyed), the agent's body configuration (e.g., sitting, standing, crouching), and/or the current activity (e.g., conversation, eating, reading, changing tires, etc.). These context features may be easily extended to capture other relevant aspects of context. The puppet also may receive notifications of state or context changes 86 that occur in the surrounding environment and that may influence the choice of communicative behaviors.

Given the desired communicative function, the social puppet 82 may select or construct a behavior description that is appropriate for the current context. This may be achieved using FML to BML mapping rules 104, or some other set of rules or procedures. For example, if the agent's attitude is respectful, an FML to BML mapping rule may select a respectful gesture such as placing the hand over the heart to accompany a response to a greeting. If however the agent's attitude is suspicious, an FML to BML mapping rule may select a standoffish gesture such as folding the arms instead.

The following are some examples of rules that may be used to select communicative behaviors in different situations. The player character may walk toward a non-player character. When the player reaches a certain distance from the non-player character, this may signal a state or context change 86, indicating that the player is close enough to start a conversation. The scenario logic 53 shown in FIG. 8 may ascribe a communicative intent to the player, i.e., the intent to start a conversation. The non-player character may then be directed to perform the communicative intent to show recognition. Suppose furthermore that the social simulation is of a village setting in Afghanistan, where it is not customary for women to interact with strangers. Then different non-player characters may apply different FML to BML mapping rules, resulting in very different show-recognition behaviors. If the non-player character is a child, the child may run up to the player and perform body animations that are indicative of excitement and interest. If the non-player character is a woman the character may turn away and avert its gaze.

Once the social puppet 82 is done generating behaviors and aligning them with their semantic units, it may combine them into a schedule of actions to be performed. These may then be passed to the action scheduler 57. The action scheduler 57 may start execution of each element, behavior by behavior.

If the action schedule is specified in BML or some other structured representation, the action scheduler 57 may compile the specification into a directed acyclic graph whose nodes are the primitive behavior elements and the arcs are the temporal dependencies between elements. The action scheduler 57 then may execute the specification by progressively dequeueing elements from the directed acyclic graph and sending them to the game engine for execution. If the element fails to execute successfully, a failure action may be activated or the overall behavior may be aborted; otherwise if the element completes, the pending actions are checked, and if another action depends upon the completed action and is not waiting for other elements to complete, it may be activated. The process may continue until all component elements are complete or otherwise have been disposed of, at which point the scenario logic 53 shown in FIG. 8 may be notified that behavior execution is complete.

The separation between communicative function and communicative behavior, and the use of mapping rules to define the realization of communicative functions, may enable multidisciplinary teams to author content. An animator may create a repertoire of basic animation elements, and then a cultural expert or other content expert may use an authoring tool to select behaviors to realize a particular communicative function in a particular context, e.g., to choose gaze aversion behaviors for Afghan women characters as realizations of show-recognition communicative intents. Programmer effort may be unnecessary in order to create animated characters with believable interactive communicative behaviors.

Figure 14:
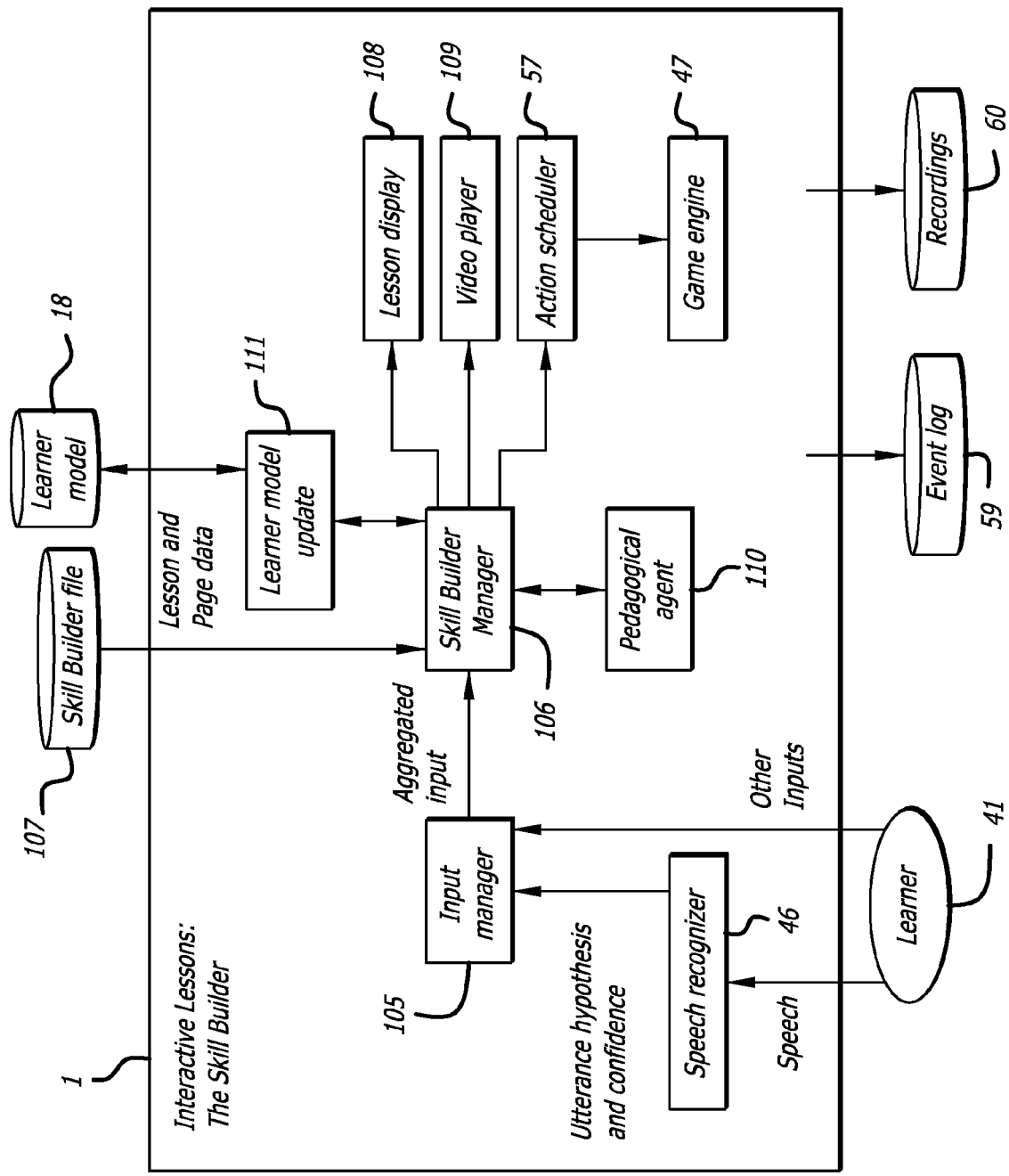
FIG. 14 is a data flow diagram illustrating modules within an interactive lessons, as well as data stores that serve as inputs and outputs and users who interact.

FIG. 14 is a data flow diagram illustrating modules within an interactive lesson, as well as data stores that serve as inputs and outputs and users who interact. A skill builder 1 of the learning system may be utilized to deliver the interactive lessons. As with the social simulation games, learners may interact with the system using a combination of speech and other inputs such as mouse clicks. Speech may be processed by a speech recognizer 46, which in this case may produce a hypothesized utterance and, if required for the particular lesson page, may also produce an estimate of confidence in the hypothesis as well as other outputs. These, along with the other inputs, may be passed to an input manager 105. The input manager 105 may aggregate the inputs, as in the social simulations, and may pass them to a skill builder manager 106. The skill builder manager 106 may coordinate the display of lesson material, analysis of learner responses, and delivery of feedback.

The skill builder manager 106 may select lesson page descriptions from a skill builder file 107, which may encode the content of each lesson and lesson page. The skill builder file 107 may be the lesson content specification file created during the authoring process. Alternatively, the lesson content may be compiled into binary form and loaded into a teaching device, either as part of the same program or as a separate database. Alternatively, the lesson content may reside on a separate server, and be downloaded over a network on demand.

Lesson content may consist of a set of lesson pages, each of which may be an instance of a lesson page template. The set of lesson page templates may be extensible. Page templates may include:

Example dialog pages. Here the learner may view animations or videos of characters engaging in a dialog. As the characters engage in the dialog, a typescript may display what the characters are saying as well as a translation. Interface widgets may be provided that allow the learner to pause or replay the dialog. Example dialogs illustrating the new content to be learned may appear, typically at the beginning of each lesson or section of a lesson.

Vocabulary pages, which may introduce new phrases, vocabulary, and grammatical forms. These pages may include recordings of native speakers speaking the new vocabulary, translations in the learner's native language, transliterations and/or written forms in the standard orthography, notes and explanations, and interface widgets that allow the learner to say the phrases and receive immediate computer-generated feedback on their pronunciation. Feedback may be selectively disabled on individual phrases, particularly short phrases, where speech recognition accuracy is insufficient to provide reliable feedback. The type of feedback provided on these pages may be a settable system parameter, depending upon the accuracy of the speech recognizer for the target language and/or the level of proficiency of the learner. Complex phrases may be built up gradually from individual words and subphrases, to further clarify the grammatical structure. Phrases in the target language and translations may be color-coded so that the learner can quickly see the correspondence between them.

Memory pages, which may test the learner's mastery of the vocabulary being studied. These may display translations of the phrases being learned and interface widgets that allow the learner to say the phrases and receive immediate computer-generated feedback on their pronunciation. The individual phrases may be drawn from previous vocabulary pages, but may be randomized so that learners are not simply recalling the order in which phrases appeared on the previous vocabulary page. These memory pages may be generated automatically by the automated generation functions 151 that operate on the interactive lesson specifications 127, relieving the lesson authors of the burden of specifying these pages.

Utterance formation pages. Here the learner may be provided with a prompt, consisting of a spoken phrase in the target language, a statement in the learner's native language, and/or a picture, and the learner may compose a spoken response in the target language. An example prompt is the following: "Ali has just said hello to you in Iraqi. Say hello back to him." Each utterance formation page may include a set of possible correct responses, and a set of possible incorrect responses, and feedback to give in response to each correct and incorrect response. The learner's utterance may be matched against the expected utterances, and the skill builder may give feedback according to whether or not the learner's response is correct. Utterance formation pages may appear either as exercises, where the learner can freely view the preferred answer by clicking a button, or as quiz items, where the preferred answer may be withheld until after the learner has made a certain number of attempts to provide a correct response.

Information pages. These may present information and notes to the learner, and may employ a combination of text and images. Information pages may be used to introduce each new lesson topic, as well as provide relevant cultural background material.

Multiple-choice exercise pages. On these pages the learner may be presented with a question and/or prompt, utilizing text, voice recordings, and/or images. The learner may be presented with a list of possible responses, and must choose the proper response. In some pages multiple responses may be permissible, and the trainee may choose one or more correct responses.

Match exercise pages. Here the learner may be presented with a list of items and a list of translations, in random order. The learner may choose an ordering that puts the items in proper correspondence.

Active dialog pages. These are simplified instances of interactive social simulations 2 (as shown in FIG. 6), inserted into the interactive lessons 1, in order to begin to give learners practice. They are similar to example dialog pages, except that the learner may speak on behalf of one of the characters in the dialog. When it is the learner's turn in the dialog, the learner may be prompted with a hint of what is appropriate to say at that point. The expected target language phrase may also be called up, if the learner is still uncertain of what to say. Thus the active dialogs simulate natural dialog, but are more heavily scaffolded than the dialogs that occur in the social simulations. That is to say, in active dialogs the learner may be prompted regarding what to say at each point in the dialog, whereas in the social simulations the learner may be permitted to say a wider range of utterances appropriate to that situation. Each lesson may culminate with an active dialog that requires the learner to apply the skills that have been taught in the lesson.

A Pronunciation page. This may include examples of sounds in the target language. The learner may refer to this page at any time during the lessons in order to review and practice the pronunciation of unfamiliar sounds.

A Progress page. This may display the learner's current level of mastery of each skill being learned. This may be accessible throughout the Skill Builder, and may be accessible in other contexts such as the interactive games.

A Lesson Display module 108 may display the lesson pages. It also may display the learner's progress in mastering the skills covered in the lesson material.

Additional modules may be employed to implement particular types of lesson pages. The example dialog pages and active dialog pages may require a video player 109 if the dialogs are presented using recorded video, and an animation player if the dialogs are presented using animations. The skill builder 1 may make use of same action scheduler 57 and game engine 47 used in the social simulation.

A pedagogical agent 110 may be employed to evaluate learner performance in the lesson pages, particularly the vocabulary page, and generate feedback. When enabled, it may be invoked on each learner's speech input to a vocabulary page. It may evaluate the quality of the learner's speech, may identify the most significant error, and may generate feedback that informs the learner of the nature of the error and aims to encourage and motivate as appropriate. Alternatively, the skill builder manager 106 may process some user responses and generate feedback itself.

The skill builder 1 may access and update a learner model 18, based upon the learner's performance in the lessons. A learner model update module 111 may continually update the current estimates of learner mastery of each skill, based on learner performance on each page. It then may periodically save the updates to the learner model 18.

The learner model update module 111 may utilize a Bayesian knowledge tracing algorithm that computes estimates of mastery statistically, similar to the knowledge tracing method of Beck and Sison. Beck, J. and Sison, J. (2004). Using knowledge tracing to measure student reading proficiencies. In Proceedings of ITS 2004. In *Proceedings of the* 2004 *Conference on Intelligent Tutoring Systems,* 624-634 (Berlin: Springer-Verlag). The entire content of this publication is incorporated herein by reference. Each correct learner speech input may be regarded as uncertain evidence that the learner has mastered the skills associated with that item, and incorrect learner speech input may be regarded as uncertain evidence that the learner has failed to master those skills. The Beck and Sison method may not apply precisely, since the Beck and Sison method applies to reading skills, in particular grapheme to phoneme translations, whereas the Learner Model Update module may apply to communicative skills generally, and applies to foreign language skills. Moreover, it may use a wide range of learner inputs and not just speech input. Once properly calibrated with appropriate prior probabilities, the learner model update module 111 may provide accurate and up-to-date assessments of learner proficiency that work well with beginner language learners.

As the learner 41 interacts with the skill builder 1, learner actions may be recorded in an event log 59 and learner speech samples may be saved in a database of recordings 60. These may be used to evaluate system performance and learner outcomes. In fact, in one possible method of employing the skill builder 1, the speech recognizer 46 may be disabled and the skill builder 1 may be used to record samples of learner speech, which can then be employed to train the speech recognizer. This may be appropriate at early stages of development of language training systems, when a trained speech recognizer for the target language has not yet been developed.

The skill builder 1 may be implemented using the same game engine as is used for the social simulations. This makes it possible for learners to switch quickly and easily between the interactive lessons and the social simulations. This in turn may encourage learners to apply the skills that they acquire in the skill builder 1 in the social simulations, and refer to the relevant skill builder lessons to help them make progress in the social simulation games.

Figure 15:
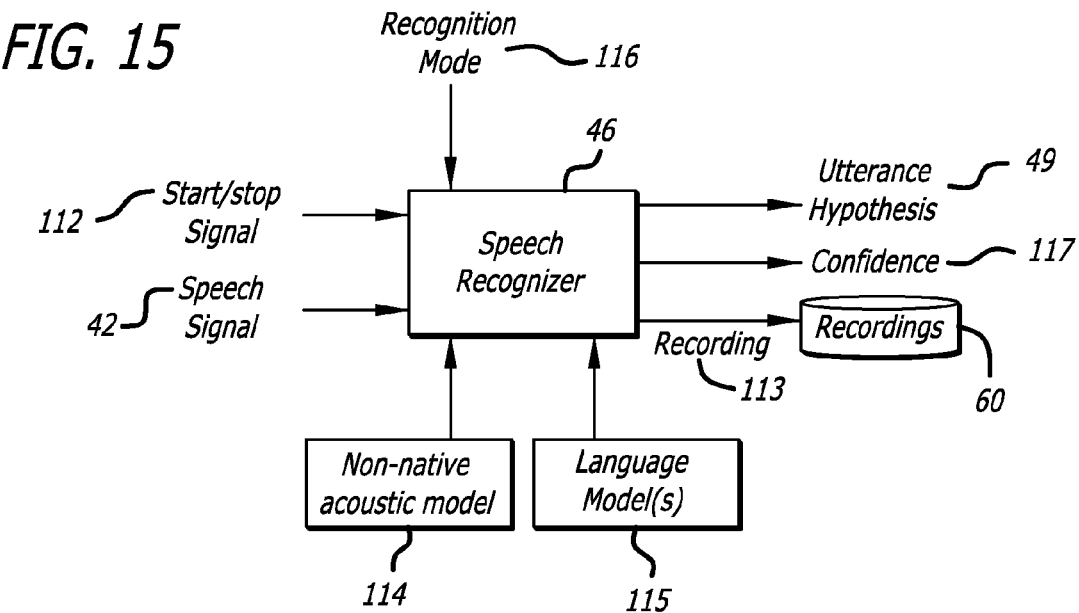
FIG. 15 is a data flow diagram illustrating inputs and outputs to a speech recognition module.

FIG. 15 is a data flow diagram illustrating inputs and outputs to a speech recognition module. The speech recognition process may be performed by any speech recognition decoder (e.g., HTK, (see Recent advances in large-vocabulary speech recognition: An HTK perspective. Tutorial presented at ICASSP 2006. IEEE Computer Society Press), Sonic (Bryan Pellom, "SONIC: The University of Colorado Continuous Speech Recognizer", University of Colorado, tech report #TR-CSLR-2001-01, Boulder, Colo., March, 2001), Julius (A. Lee, T. Kawahara and K. Shikano. "Julius—an open source real-time large vocabulary recognition engine." In Proc. European Conference on Speech Communication and Technology (EUROSPEECH), pp. 1691-1694, 2001), or Sphinx (Placeway, P., Chen, S., Eskenazi, M., Jain, U., Parikh, V., Raj, B., Ravishankar, M., Rosenfeld, R., Seymore, K., Siegler, M., Stern, R., Thayer, E., 1997, The 1996 HUB-4 Sphinx-3 System, Proc, DARPA Speech Recognition Workshop, Chantilly, Va., Morgan Kaufmann Publishers), the entire content of all of these publications is incorporated herein by reference) that operates on hidden Markov acoustic models of speech, that supports grammar-based language models, and that supports dynamic switching of language models and/or acoustic models.

A speech recognizer 46 may take as input a start/stop signal 112, which signals when to start recognition and when to stop recognition. The start/stop signal 112 may be generated by clicking a button on the graphical user interface, or may be produced by some other signaling device. Between the start and stop signal, the speech recognizer 46 processes the speech signal 42 from the user's microphone. It may process the speech signal as the user speaks it, or it may first record the user's speech as a sound file and then process the sound file. Either way, a recording 113 may be created, which may be stored in a file of recordings 60 on the user's computer or on a remote server.

The speech recognizer 46 may operate using a non-native acoustic model 114, i.e., an acoustic model of the target language that is customized to recognize the speech of non-native speakers of the target language. This customization may be performed by training the acoustic model on a combination of native and non-native speech. Alternatively, the properties of non-native speech may be used to bias or adjust an acoustic model that has been trained on native speech. Different acoustic models may be used in the interactive lessons and social simulations, and even in different parts of each, in order to maximize robustness of recognition. For example, the acoustic model used in the social simulation may be trained on poorly pronounced non-native speech, to ensure that learners with poor pronunciation are able to play the game. In the contrast, the acoustic model used in advanced lessons may be trained on well-pronounced non-native speech and native speech, and therefore less tolerant of learner error and able to discriminate learner errors. A recognition mode indicator 116 may be used to indicate which acoustic model to use.

The speech recognizer may use a language model 115 to determine which phrases to recognize. Context-free recognition grammars may be used; alternatively, n-gram language models may be used. The language models may be tailored to the particular context in which recognition will be used. For example, in the social simulations a set of language models may be built, each tailored to recognize the particular repertoire of communicative acts that are expected to arise in each scene. In the interactive lessons recognition grammars may be created from the sets of words and phrases that occur in groups of lesson pages. The size of the group of words and phrases may depend upon the desired tolerance of learner error, since increasing the grammar size generally reduces the tolerance of pronunciation errors. Grammars containing specific classes of language errors may also be used, in order to help detect those classes of errors. This technique may be used both to detect pronunciation errors and other types of errors such as grammatical errors. For example, common mispronunciations of the Arabic pharyngeal fricative consonant /H/ can be detected by taking words that incorporate that consonant, e.g., /marHaba/ (an informal way of saying "hello"), and creating a recognition grammar that includes the correctly pronounced word as well as common mispronunciations such as /marhaba/ and /markhaba/. Then if a learner mispronounces the word in one of these ways, the speech recognizer may be able to detect it.

For each speech input, the speech recognizer may output the most likely utterance hypothesis 49, in textual form. The speech recognizer may also input the level of confidence 117 of the recognition. The skill builder manager 106 shown in FIG. 14 may use both in determining the appropriate feedback to give to the learner.

Figure 16:
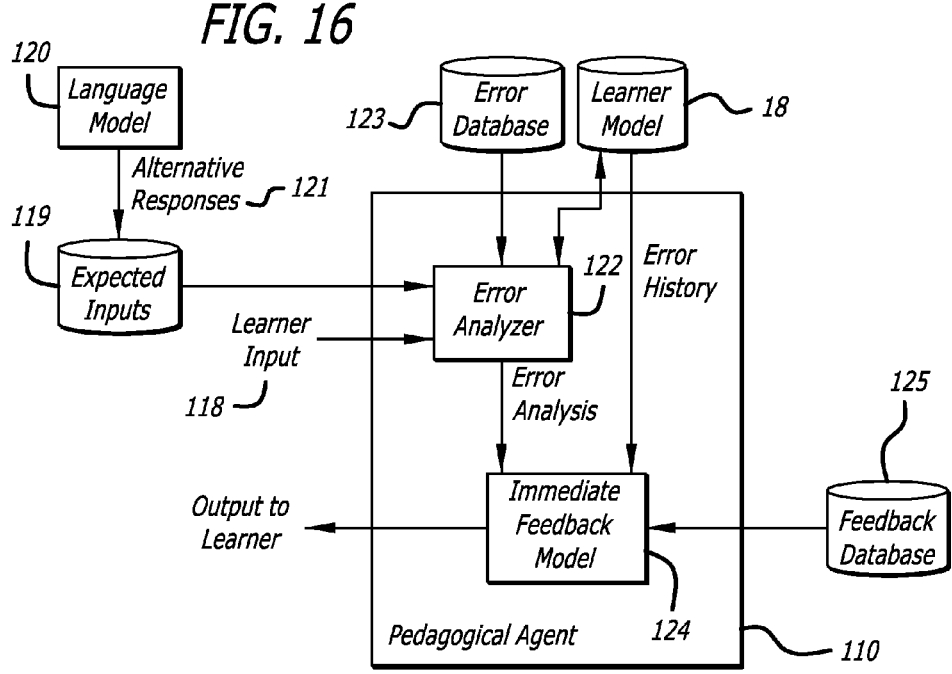
FIG. 16 is a data flow diagram illustrating inputs and outputs that may be used by a pedagogical agent module, which may be a component of interactive lessons.

FIG. 16 is a data flow diagram illustrating inputs and outputs that may be used by a pedagogical agent module, which may be a component of interactive lessons. A pedagogical agent 110 may be provided with a set of inputs, some of which may be supplied by the skill builder manager 106 shown in FIG. 14. One of these may be a description of the current learner input 118. This may include the utterance hypothesis and level of confidence produced by the speech recognizer. Another may be a description of expected inputs 119. These may include possible correct responses to the current lesson item and possible incorrect responses that the learner might be expected to produce.

For some lesson items, such as vocabulary page items and memory page items, there may be just one expected correct answer; if, for example, an item is a vocabulary item introducing the Arabic word /marHaba/, there is only one expected correct response. For some items such as utterance formation page items, there may be multiple possible correct responses. For example, consider an utterance formation page in Tactical Iraqi, where the prompt is as follows: "Hamid just introduced himself to you. Respond to him by saying that you are honored to meet him." Multiple Iraqi Arabic responses may be permissible, including "tsherrafna," "tsherrafna seyyid Hamid," or "tsherrafna ya seyyid." In such cases a set of possible correct responses may be included among the expected inputs 119. For some lesson items a wide range of correct responses may be possible, in which case a pattern or description characterizing the set of possible correct responses may be provided, or even a procedure for generating possible correct responses or for testing individual responses to determine whether or not they are correct. Also, a language model 120, with knowledge of the structure of the target language and/or common errors that language learners make, may be used at authoring time to generate possible correct alternative responses 121.

Likewise, the expected inputs 119 may include possible incorrect responses, patterns or descriptions of expected incorrect responses, or procedures for generating incorrect responses. The language model 120 may be used to generate possible incorrect responses as well. The pedagogical agent 110 may further assume that any input that is not explicitly designated as correct or incorrect may be presumed incorrect.

The learner input 118 and expected inputs 119 may be passed to an error analyzer module 122. The error analyzer module 122 may evaluate the learner's input to identify specific errors committed by the learner, and may select one or more errors to focus on in producing feedback. This evaluation may involve classifying the learner's error, and matching it against known classes of learner error. As an example, suppose that the learner was prompted to say /marHaba/ (with the voiceless pharyngeal fricative /H/), and instead says /marhaba/ (with the voiceless glottal transition /h/ instead). This is an instance of a common class of pronunciation errors committed by English-speaking learners of Arabic: to substitute /h/ for /H/. Classifying the error in this case thus might analyze this error as an instance of /H/→/h/ phoneme substitution. This classification process may be assisted by an error database 123, listing severe language errors commonly made by language learners, with their frequency. This database in turn may be produced through an analysis of samples of learner speech.

If this process yields a set of error classes, the error analyzer may then select the error class or classes that should serve as the focus of instruction. This may take into account the confidence rating provided by the speech recognizer; specific feedback on particular learner errors may be inadvisable if the confidence that the error has in fact been detected is low. Confidence may be boosted if the learner model 18 shows that the learner has a history of making this particular error. If an utterance exhibits multiple errors, then the error analyzer module 122 may select an error to focus on based upon its degree of severity. Native listeners judge some language errors to be more severe than others; for example errors that can lead to confusions between words tend to be regarded as highly severe. If the error database 123 includes information about the relative severity of errors, this can then be used to prioritize among errors.

As errors are detected, or as the learner demonstrates the ability to generate responses without errors, this information may be used to update the learner model. Error instances may be added to the history of learner performance. Moreover, each instance of correct or incorrect performance may serve as probabilistic evidence for the mastery of particular language skills, or the lack thereof. The confidence level provided by the speech recognizer may further be used to adjust the probability that an instance of correct or incorrect language performance was in fact observed. This evidence and confidence may be used in a Bayesian network or other probabilistic model of skill, where the probabilities that the individual responses were or were not correct propagate back through the network to produce probabilities that the underlying skills were or were not mastered.

Once an error has been detected and chosen, or no error has been found, an immediate feedback model 124 may determine what response to give to the learner. It may select a feedback message from a feedback database 125. The feedback database 125 may include a collection of tutoring tactics commonly employed by language tutors, and/or specific feedback tactics recommended by a lesson author to use in response to particular errors. The immediate feedback model 124 may also take into account the learner's history of making particular errors, noting for example when the learner pronounces a word correctly after multiple failed attempts. The immediate feedback model 124 may also take into account the learner's profile, in particular the learner's general skill at language learning and self-confidence. The feedback messages may be chosen and phrased in order to mitigate direct criticism. See W. L. Johnson, S. Wu, & Y. Nouhi (2004). Socially intelligent pronunciation feedback for second language learning. In *Proceedings of the Workshop on Social and Emotional Intelligence in Learning Environments at the* 2004 *International Conference on Intelligent Tutoring Systems*. Available at http://www.cogsci.ed.ac.uk/~kaska/WorkshopSi. The entire content of this publication is incorporated herein by reference.

Once the immediate feedback model 124 has chosen a feedback message to give to the learner, may be output. This output may be realized in any of a variety of modalities, including text, a voice recording, a synthesized voice, a video recording, an animation coupled with text, or animation coupled with voice.

Figure 17:
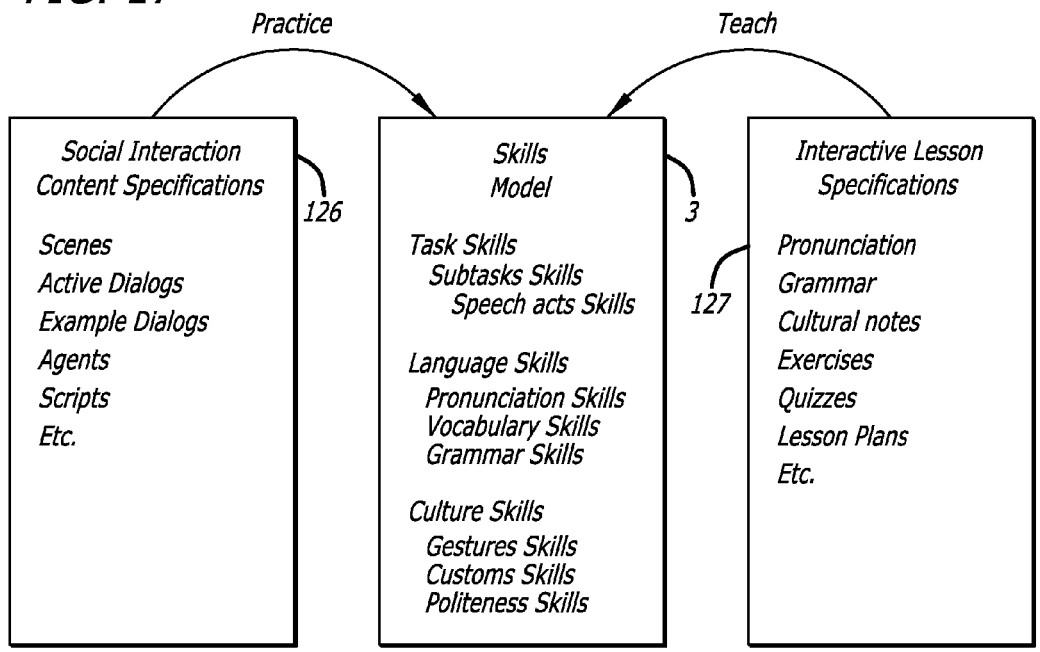
FIG. 17 is a diagram illustrating components of interactive lessons and social interactions, and components of a skills model that may define skills being taught and tracked in a learner model.

FIG. 17 is a diagram illustrating components of interactive lessons and social interactions, and components of a skills model that may define skills being taught and tracked in a learner model. The idea of modeling skills is that each behavior of the learner/user can be analyzed through several dimensions. These dimensions may include: language, culture, and task (or action). So, for example, saying marHaba ("hello" in Lebanese Arabic) can be analyzed as displaying skills like:

Language/vocabulary=marHaba

Culture/Gesture=palm-over-heart

Action/Task=greet

Skills can be used to annotate the content in all parts of the system (interactive lessons 1, interactive social simulations 2, other interactive games 17, etc.). This way the different content elements are explicitly linked to all the skills they either teach or practice. Specifically:

Social interaction content specifications 126, i.e., definitions of the content and behavior of the interactive social simulations 2 used for practicing skills may be linked to specific items in the skills model 3. The links indicate what skills are practiced in that social interaction. For example, a dialog may be linked to skills such as "greet respectfully" (a task skill) or "color names" (a vocabulary skill) or "palm over heart gesture" (a cultural skill). There may be zero or more links to skills of any type.

Interactive lesson specifications 127, i.e., specifications of content of interactive lessons 1, may be linked to specific items in the skills model 3. The links indicate what skills are taught in that lesson content. For example, a specific page in the skill builder 1 may be linked to any of the skills named above, or any others. Again, there may be zero or more links to skills of any type.

If the social interaction specifications or interactive lesson specifications are formatted in XML, then the link or annotation may be made by adding attributes or tags to XML files that specify that content. For example, the following is an excerpt of a skills builder XML specification that shows how a skill may be annotated to be exercised in a specific page:

<page eid="page6" category="PassiveDialog" type="Practice" nodeName=" ">

<title>Say hello</title>

<skill kid="ELO-0101-01">Use formal qreetings</skill>

There are many elements in how to make effective links from content to the skills model. Some strategies that may be employed include:

Language type skills occur in all utterances. One alternative to model that information is to annotate the utterance with language skills. Another alternative is to use a language model that automatically produces this mapping by analyzing the utterance contents against information about the language grammar, morphology, lexicon, vocabularies, etc.

Pages (or parts of pages) in the interactive lessons 1 may be constructed intentionally to teach certain language skills (say, conjugating verbs). Those pages may be tagged by the language skill(s) they teach. The system may use that information to help the user navigate to the place where to learn that skill. The system may use that information to dynamically produce a lesson that compiles all pages about that specific language skill. This strategy may be introduced in the lesson creation process to guarantee that such content exists.

The context of a lesson may be broader than (and generalize upon) the context of the scene. For example, it may contain other words of the same type used in the scene. The learner then generalizes the knowledge instead of just using them in the same context where they have been learned. Lesson authors may want to take this generalization process in mind.

Example dialogs may help the author to think about this generalization process. Example dialogs may not copy word for word the social simulation dialog. A methodology to create lessons may be to start by creating example dialogs and then use them to define which language skills are going to be addressed in the lesson.

Interactive social simulations 2 dialog contains both task/action and language skills. Once a game dialog is written, the author may be able to identify in it the tasks skills and the key language skills that need to be taught for that scene/dialog. Authors may update the skills model depending on the result of that process.

One method is to start developing the task skills in the skills model before the interactive social simulations 2 dialog is written. A taxonomy may be developed starting with objectives (mission) skills (possibly used in an interactive social simulation game), then tasks skills, then speech act skills. The process may be iterative, in that the task skills taxonomy may be refined after the social simulation game dialog is written.

The relationship between language skills and action/task skills may be varied. Pronunciation skills may have no absolute dependency with task skills. Grammar skills and vocabulary skills may have some dependency with task skills. It might not be possible to define these connections a priori in the skills model. Additional types of linkage may be defined in the skills model to denote these relationships between skills of different types (e.g., language skills and task skills).

Example dialogs may be used to highlight the principal skills taught in a lesson. While writing an example dialog, an author may sketch the lesson content by using the method of asking "which skills are emphasized here?" and "where are these skills taught?"

Figure 18:
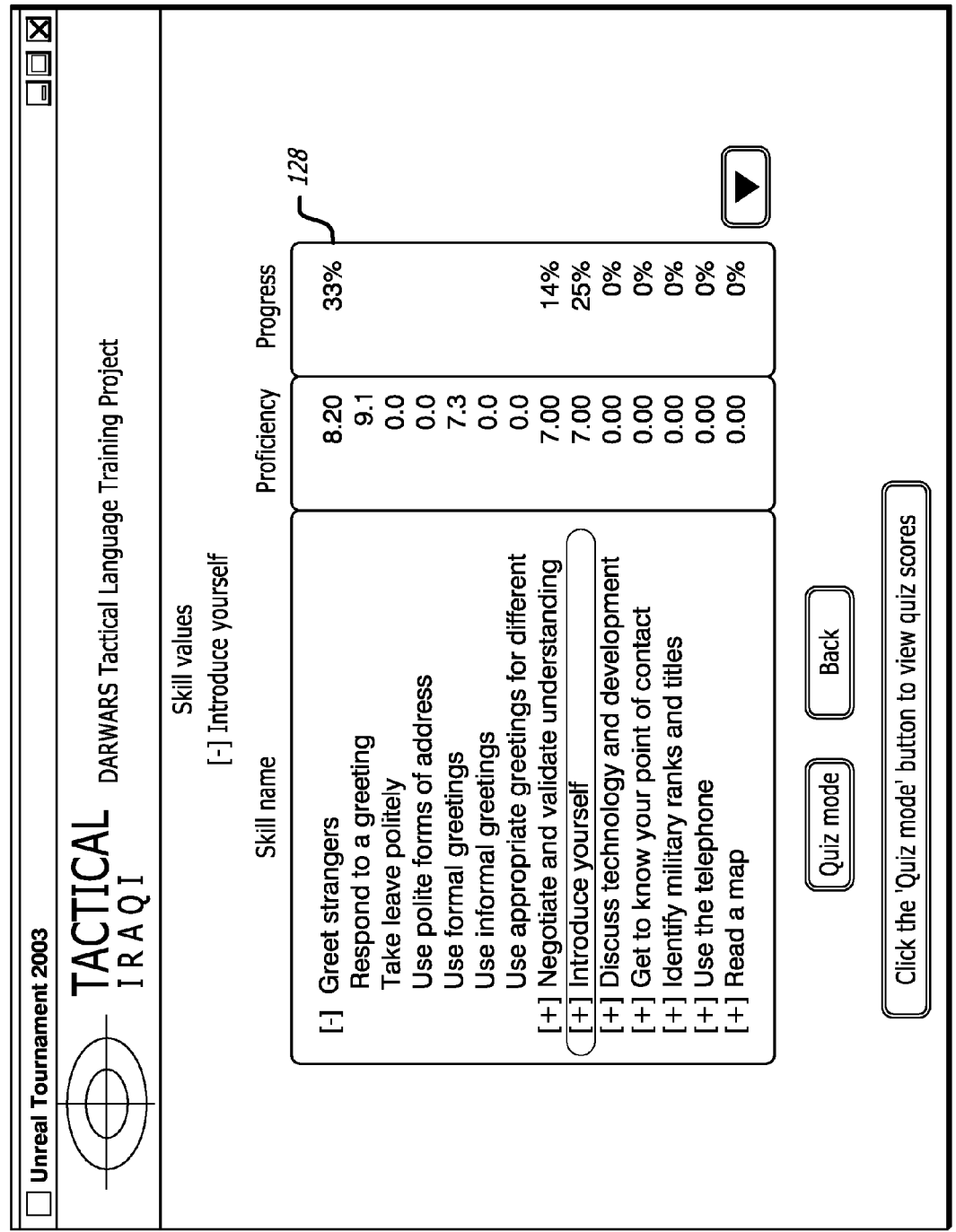
FIG. 18 is a screen displaying a learner's progress in mastering particular skills.
Figure 19:
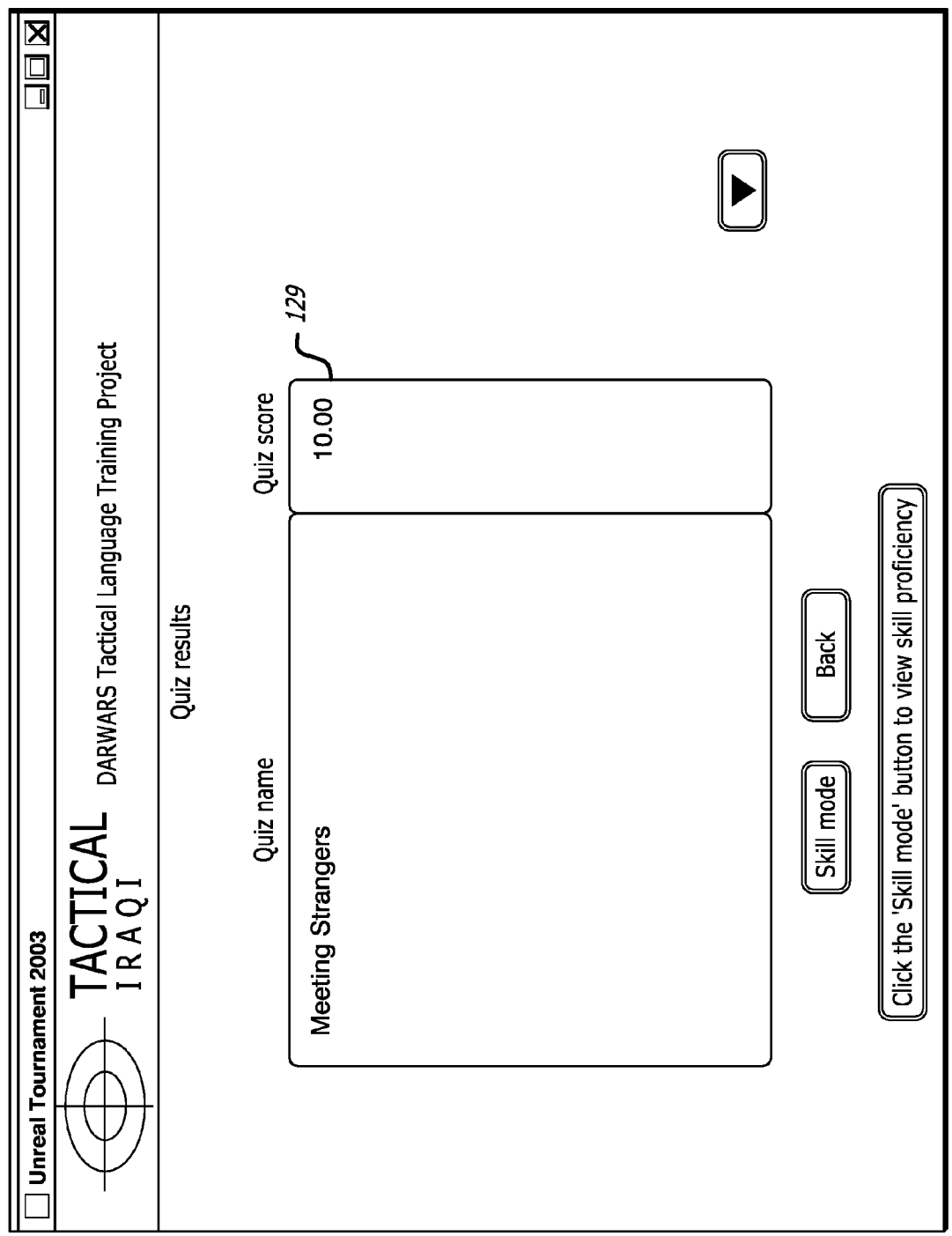
FIG. 19 is a screen displaying a learner's performance on an individual quiz.

FIG. 18 is a screen displaying a learner's progress in mastering particular skills 128. FIG. 19 is a screen displaying a learner's performance on an individual quiz 129. Once the content is annotated with skills, it can be used to help track the performance of the user. FIG. 18 shows an example progress report in the Tactical Iraqi system that displays the learner's level of performance by skill. FIG. 19 shows another progress report that displays the learner's level of performance in terms of his/her score in the quizzes administered in the system. The two displays are based on having a maximum grade on the quiz at the end of Lesson 1 for Tactical Iraqi. The skills "view" is more informative since it tells the learner what skills he/she has practiced enough so far, and what other related skills are still to be learned (in other lessons).

The skills model 3 may be used to customize lessons based on learner skills. For example, a remedial lesson may be dynamically put together at run time to address skills that the learner has shown to have problems with in the interactive social simulations 2. This may be done by using a simple algorithm that walks though the interactive lesson specification 127 and extracts the pages that have the specific skill annotated. This may also be done by using a more complex algorithm would take into consideration the performance on pre-requisite skills and assemble necessary material also for those pre-requisite skills where the learner is not performing well enough.

Skills may be used to customize lessons based on learner objectives. For example, a given embodiment of the invention may have content about many different professions. The system may ask a learner what professions he/she is interested in learning, and tailor the lesson accordingly by selecting the material with the relevant skills for those professions. This allows skills to work as a content modularization mechanism.

Figure 20:
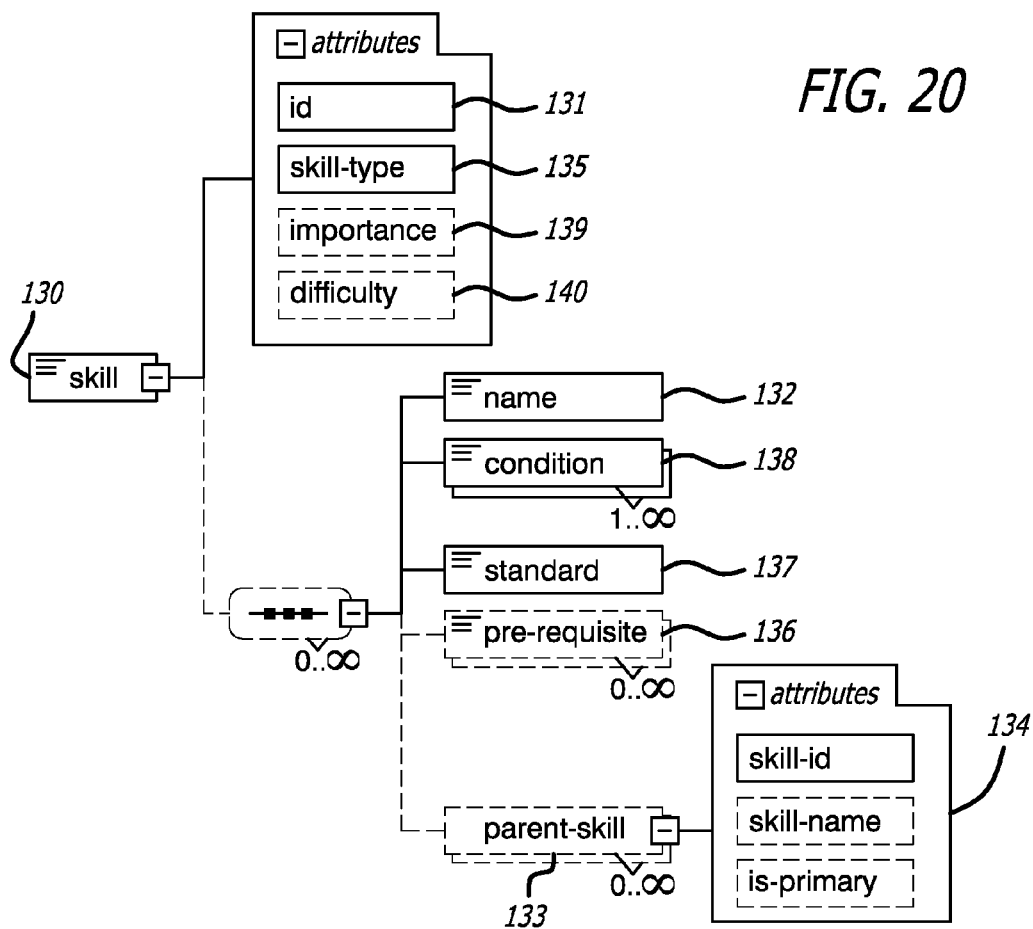
FIG. 20 is a data definition diagram showing entities, relationships, and attributes of a skill model used to organize and represent acquired skills.

FIG. 20 is a data definition diagram showing entities, relationships, and attributes of a skill model used to organize and represent acquired skills. A skills model 3 may consist of skills 130, implicitly connected in a tree with multiple parents allowed.

A skill 130 may have an ID 131 and/or a name 132. Specific usages may choose to use the same string as name and ID, or to use the name as a unique identification.

A skill 130 may have zero or more parent skills 133, specified by their IDs and optionally their names. A skill may have multiple parent skills. In order to facilitate display in a strict taxonomy or tree format, the link to a parent skill may also specify that that specific parent skill is to be considered to be the (only) primary parent 134 (as opposed to all other skills, which will be secondary parents).

A skill may have types 135. A skill may be restricted to have only one type. The following are types used so far in the system; other types are possible. Types are displayed in a hierarchy but referenced in the skill specification as a single name.

Task (alternatively called Mission)
Communication Act
Speech Act
Language
Pronunciation
Grammatical
  Lexical
  Morphological
  Syntactical
Vocabulary
Listening/Understanding
Speaking
Reading
Writing
Culture
Gesture
Social Norm Other linkages between skills may include one or more optional pre-requisite 136 skills, that is, a skill that is recommended to be learned before the skill being specified.

The details of each skill may be specified by parameters such as:

A standard 137 that specifies the level of performance to be achieved for that skill. The US military uses a number between 0 and 5 in increments of 0.5. We have used an integer between 0 and 5. Other scales may be used.

A condition 138 that specifies the context in which that skill will be tested (e.g., a soldier deployed in a foreign country). The condition may also indicate sometimes how to test the skill. Conditions may include descriptions of 1) the amount of assistance the student is allowed in meeting the conditions, 2) the time-frame within which the objective will be met, or 3) any tools or equipment the learner will need to accomplish the objective. Conditions may refer specifically to a Social Simulation Game storyline. For example, a condition may be specified as: "Given access to a virtual character, encountered as a stranger in the souk, in the fictional town of Al-Iraqi, the student will be able to select the correct gesture for his player character and speak an appropriate greeting ("marHaba") within the first 5 seconds of the encounter, without any help from the aide".

An optional importance 139 field may be used to specify the importance of that skill inside the skills model. The set of values for this field may be {high, medium, low}, a number, or others.

An optional level of difficulty 140 may be used to specify how hard it is for the average or target learner to learn the skill. The set of values for this field may be {high, medium, low}, a number, or others.

Standard and condition are elements borrowed from the structure of Enabling Learning Objectives, as used by instructional designers in the US military and elsewhere. See R. F. Mager (1984). *Preparing Instructional Objectives*. Belmont, Calif.: Pitman Management and Training. The entire content of this publication is incorporated herein by reference.

Difficulty and importance are relative concepts, because they depend on the specific learner (what is easy for some is hard for others, and a skill may be important for a medic but not a builder). These attributes may be used as a "default" or "average" for an implied or explicitly defined audience. The values of these attributes may be adjusted based on learner models that make clear the starting point from different groups of learners (e.g., someone who speaks Dutch would probably find it easier to pronounce German than someone who only speaks English).

Figure 21:
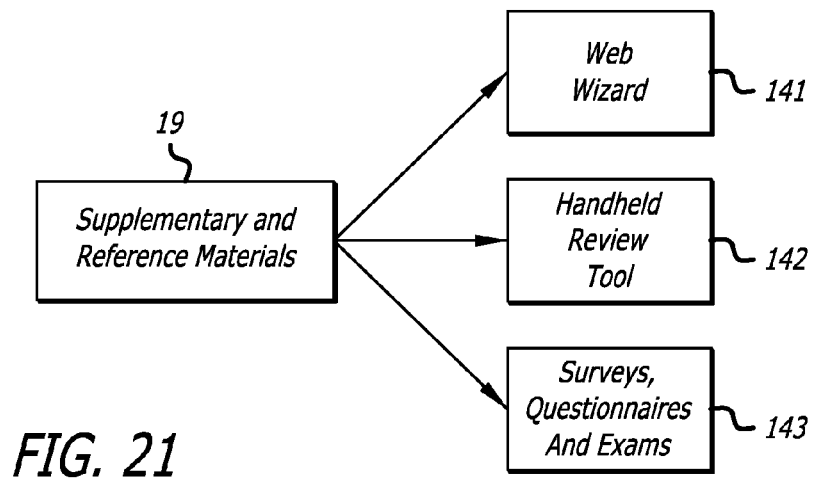
FIG. 21 is a diagram of types of supplementary and reference materials.

FIG. 21 is a diagram of types of supplementary and reference materials 19. If course materials are derived from formalized XML specifications of content, these courseware specifications may be used to help create a range of other educational resources. The following are examples of such resources:

A web wizard 141 is an adaptive hypertext resource for further study and searching of language content. It may provide access to a number of reference resources, including: (a) a glossary of words and phrases, grouped by lessons or lesson groups and possibly sorted by spelling, English translation, and semantic and grammatical categories; (b) grammatical glosses of the phrases being learned, showing the grammatical structure of sentences and the English word-by-word translations if desired; (c) a library of explanations of grammatical concepts, possibly automatically linked by a natural language parser to phrases that use them. For example, the Arabic phrase "ismi John Smith" (My name is John Smith) may be automatically linked to two grammar explanations: one about the possessive pronoun suffix "-i", and the other about that fact that Arabic has no verb meaning "to be."

Trainees may employ the web wizard selectively as they choose. Many language learners are not interested in grammar, and react negatively to lesson materials that contain linguistic jargon; grammatical terminology can be minimized in the tutoring materials and provided instead in the web wizard.

The web wizard 141 may be implemented in whole or in part in other platforms such as a game engine, a portable game, etc.

A handheld review tool 142 may be provided, which consists of a handheld computing device, such as handheld computer, portable game console, or MP3 player, on which some of the lesson or game content has been loaded. Users may employ this when they are away from the computer or other principal training device. Recordings drawn from the interactive lesson materials, and/or lesson pages, may be downloaded onto the computing device. If the recordings are converted into MP3 format, then any device capable of playing MP3 recordings may be used. A conversion tool may automatically extract material from the courseware specifications, convert to MP3 format, label, and group into categories. Trainees can then use it to search for and play phrases as they desire.

Surveys, questionnaires, and even exams 143 may be integrated in the system. This helps improve the evaluation processes. These materials may be built on variations of skill builder lessons, in which case modules that process user input (e.g., voice recording) may be reused. For instance, survey responses may be saved as part of the system's log file, and so can be retrieved from the learner's computer along with other logged data.

Other reference materials may be created, including printed materials, and subsets of the content for other platforms (e.g., a subset of the skill builder 1 on a web application).

Figure 22:
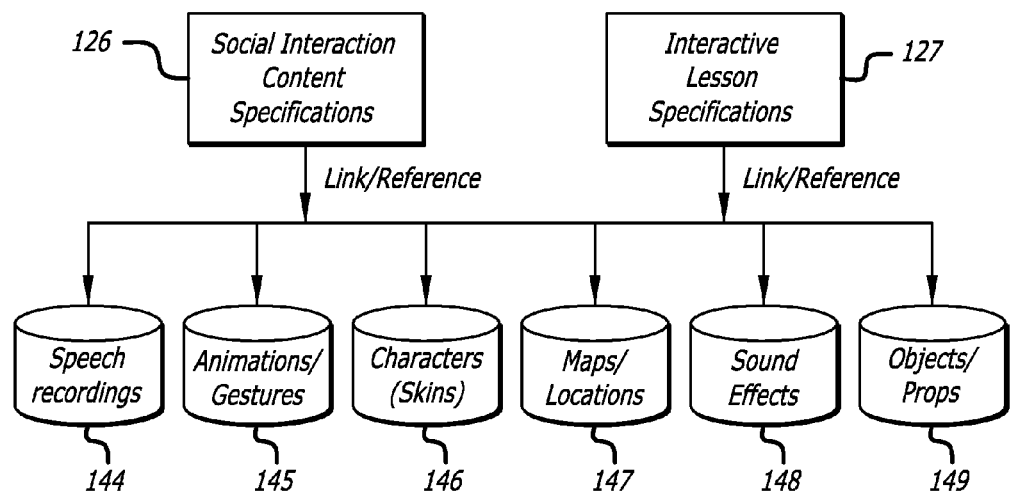
FIG. 22 is a diagram of interconnections between types of content.

FIG. 22 is a diagram of interconnections between types of content. Specific elements of the interactive lesson specifications 127 and social interaction content specifications 126 may be tied/linked to specific content items. For example, an utterance in the skill builder may be linked to audio files containing recorded speech of how to best say that utterance. Types of content may include but are not limited to: speech recordings 144, animations and gesture specifications 145, characters (skins) 146, game levels, maps, locations 147, sound effects 148, objects and props 149. The connection may be specified through tags or attributes in an XML file used to specify content. These sets of content (e.g., the set of sound effects) may be indexed and managed through databases, simple files, or organized in directories in a file system. Other indexing and description mechanisms may be used, e.g., labels in a content management system. Content items may be linked to other content items; for example, specific sound effects and characters can be linked into maps. The linkage can be done within one of the content items (e.g., adding a tag to the map file) or externally. External links may be managed as mappings (e.g., pairs or triples in a file), or through databases. Mappings may be done directly or may use intermediary abstraction layers, possibly using labels. For example, a character skin may be originally named for the person who modeled that character (e.g., John Doe whose picture was used in creating the art), and then labeled as a type of character (e.g., old man), and then linked into a scene (e.g., character Abdul in a specific social interaction uses skin "old man").

Figure 23:
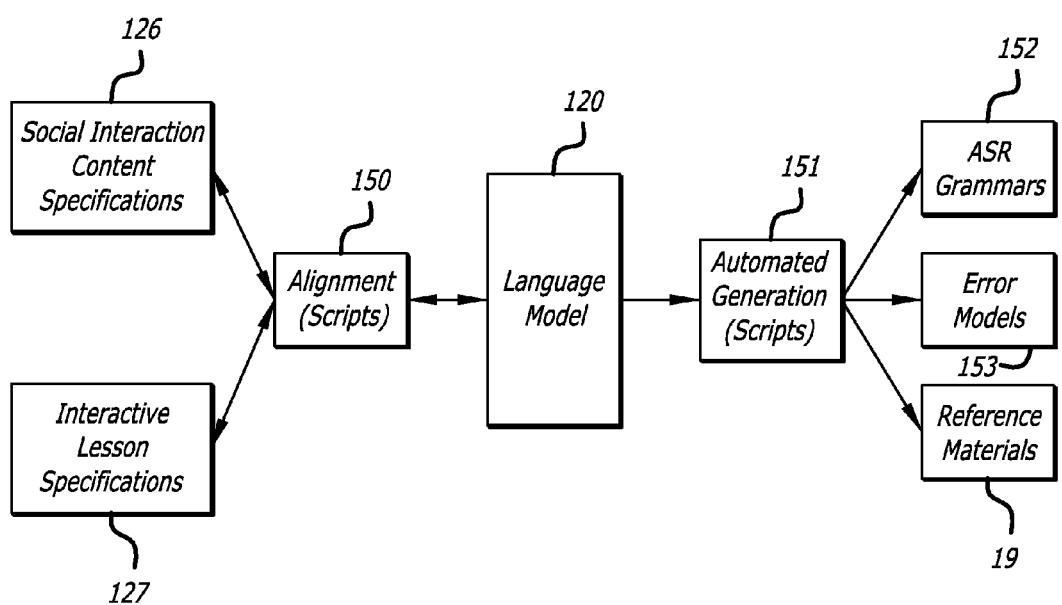
FIG. 23 is a data flow diagram indicating how content may be processed and transformed into data sets.

FIG. 23 is a data flow diagram indicating how content may be processed and transformed into data sets. A language model 120 may contain information about the language grammar, morphology, lexicon, vocabularies, utterances, etc. FIG. 23 shows how the language model 120 can be connected with other parts of the system. The language model 120 can be aligned 150 automatically (with scripts) or manually with the social interaction content specifications 126 and/or interactive lesson specifications 127. In this way we can be sure that the language elements used in the system are covered by the language model, and vice versa. For example, we can be sure that all words used in the dialogs are covered in the language model. The language model may also distinguish the subset of the language used in the system from elements of the language that are not used. For instance, it may contain a list of names of professions of which only a subset is used in the system, and have that distinction covered in such a way that a system could query the language model and ask whether that specific words is either (a) covered in the learning system, (b) not covered in the learning system but known as part of the broader language, or (c) neither. This may be useful when broad resources for modeling a language (say a dictionary) are available but only a subset of that material is covered in a specific instance of Tactical Language.

FIG. 23 also shows how, once the language is specified in the language model, it can be used to automatically or semi-automatically generate 151 other components or specifications used by the system. For example, it can be used to generate the speech recognition grammars 152 used in different modules; error models 153 that are used to analyze errors in learner utterances, or reference materials 19 such as the web wizard 141 (shown in FIG. 21). This helps to maintain consistency between all these elements and reduces the time and errors involved in updating these components once changes are made in the tutorial or social interaction content.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

In short, the scope of protection is limited solely by the claims that now follow. That scope is intended to be as broad as is reasonably consistent with the language that is used in the claims and to encompass all structural and functional equivalents. Nothing that has been stated or illustrated is intended to cause a dedication of any component, step, feature, object, benefit, advantage, or equivalent to the public, regardless of whether it is recited in the claims.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials

We claim:

1. A character programming and control system for programming and controlling an automated non-player character that interacts with a player character during an immersive game in a simulated world based on (1) high-level communicative functions, each representing the illocutionary force of the intended communication which the non-player character is to perform during the immersive game in the simulated world; (2) communicative behaviors, each representing a speech or non-verbal communicative act that the non-player is to perform during the immersive game in the simulated world that wholly or partially implements one or more of the high level communicative functions; and (3) current contexts, each representing a current state and/or current environment of the virtual character during the social simulation; the system comprising:

a set of mapping rules, each mapping at least one of the high-level communicative functions during at least one of the current contexts to at least one of the communicative behaviors;

a social puppet module configured to locate a rule within the mapping rules which maps one of the high-level communicative functions during one of the current contexts of the non-player character in the immersive game in the simulated world to at least one of the communicative behaviors; and an action scheduler configured to convert each of the communicative behaviors located by the social puppet module within the mapping rules into a sequence of one or more animations that the non-player character performs during the immersive game in the simulated world that implement the specified communicative behavior.

2. The character programming and control system of claim 1 further comprising:

a behavior module configured to cause the virtual character to perform selected programmed movements during the social simulation;

an authoring tool configured to receive from an author and store as attitude mapping rules a plurality of attitudes that the virtual character may possess at some point during the social simulation, including at least the attitude of annoyance, contentment, respectfulness, or suspiciousness, and, for each attitude, to map a selection from the author of one or more of the programmed movements which the virtual character should perform to implement the attitude; and a social puppet module configured to dictate which of the programmed movements should be performed by the virtual character based on an attitude which the virtual character possess at a particular time during the social simulation by consulting the attitude mapping rules to determine which movements correspond to the attitude.

3. The character programming and control system of claim 1 wherein the mapping rules map at least two of the high-level communicative functions to the same communicative behavior.

4. The character programming and control system of claim 1 wherein each high-level communicative function is expressed with words descriptive of that function.

5. The character programming and control system of claim 1 wherein each communicative behavior is expressed with words descriptive of that behavior.

6. The character programming and control system of claim 1 wherein each high-level communicative function is expressed with words descriptive of that function and wherein each communicative behavior is expressed with words descriptive of that behavior.

7. The character programming and control system of claim 1 wherein:

the mapping rules are also based on cultural norms;

a first of the mapping rules maps a first communicative function during a first current context to a first communicative behavior that is indicative of a communicative behavior normally exhibited by a person of a first culture when performing the first communicative function during the first current context; and a second of the mapping rules maps the first communicative function during the first current context to a second communicative behavior which is different from the first communicative behavior and that is indicative of a communicative behavior normally exhibited by a person of a second culture that is different from the first culture when performing the first communicative function during the first current context.

8. The character programming and control system of claim 2 wherein the action scheduler is configured to cause the virtual character to perform the programmed movements dictated by the social puppet.

9. The character programming and control system of claim 2 wherein the attitude mapping rules include one or more mapping rules which each indicate that head movement should be performed for at least one of the attitudes.

10. The character programming and control system of claim 2 wherein the attitude mapping rules include one or more mapping rules which each indicate that hand movement should be performed for at least one of the attitudes.

11. The character programming and control system of claim 2 wherein the attitude mapping rules include one or more mapping rules which each indicate that torso movement should be performed for at least one of the attitudes.

12. The character programming and control system of claim 2 wherein the attitude mapping rules include one or more mapping rules which each indicate that a facial expression should be made for at least one of the attitudes.

13. The character programming and control system of claim 2 wherein the attitude mapping rules include one or more mapping rules which each indicate that a gaze should be performed for at least one of the attitudes.

14. The character programming and control system of claim 2 wherein the mapping rules include one or more mapping rules which each indicate that an utterance should be performed for at least one of the attitudes.

15. The character programming and control system of claim 2 wherein at least one of the programmed movements is for the virtual character to communicate with the user during the social simulation.

16. A character programming and control system for programming and controlling a virtual character during a social simulation, comprising:

a behavior module configured to cause the virtual character to perform selected programmed movements during the social simulation;

an authoring tool configured to receive from an author a selection of a plurality of programmed attitudes that the virtual character should exhibit during the social simulation; and a social puppet module configured to dictate which of the programmed movements correspond to each of the selected attitudes, wherein one of the programmed attitudes is annoyance or a substantially similar attitude.

17. A character programming and control system for programming and controlling a virtual character during a social simulation, comprising:

a behavior module configured to cause the virtual character to perform selected programmed movements during the social simulation;

an authoring tool configured to receive from an author a selection of a plurality of programmed attitudes that the virtual character should exhibit during the social simulation; and a social puppet module configured to dictate which of the programmed movements correspond to each of the selected attitudes, wherein one of the programmed attitudes contentment or a substantially similar attitude.

18. A system for teaching a user how to communicate with non-verbal movements in conformance with the norms of a particular culture, comprising:

a user interface configured to teach a user how to act in conformance with the norms of a particular culture, including a display which displays a virtual character which represents the user and a non-verbal movement which the user has decided to have the user's virtual character make as a means of communicating a message to an automated virtual character during the user's participation in a social simulation in which both the user's and the automated virtual characters appear; and an input manager module configured to receive the non-verbal movement which the user's virtual character has made and map this into a communicative act that represents what the non-verbal movement would normally be interpreted to mean based on the context of the non-verbal movement and the norms of the particular culture.

19. The system for teaching of claim 18 further comprising a social simulation module configured to cause the automated virtual character to respond to the communicative act in a manner that is consistent with the norms of the particular culture.

20. The system for teaching of claim 19 wherein the social simulation is configured to determine whether the non-verbal movement of the user is consistent with the norms of the particular culture.

21. The system for teaching social skills of claim 18 further comprising a learner model module that generates an assessment representative of the user's proficiency in learning the norms of the particular culture based at least in part on the non-verbal movement.

22. The system for teaching of claim 18 wherein the non-verbal movement is a gesture.

23. The system for teaching claim 18 further comprising:
a first mapping rule that maps a first non-verbal movement into a first message that is normally indicated by the first movement when performed by a person of a first culture; and
a second mapping rule that maps the first non-verbal movement into a second message that is different from the first message and that is normally indicated by the first movement when performed by a person of a second culture which is different than the first culture.

24. The system for teaching of claim 22 further including a social simulation module configured to evaluate whether the gesture is consistent with social norms for the particular culture.

25. The system for teaching of claim 22 wherein the gesture is a hand gesture.

26. The system for teaching of claim 22 wherein the user interface includes a video camera and image processing apparatus configured to allow the user to act out the gesture.

27. A character programming and control system for programming and controlling an automated non-player character that interacts with a player during an immersive game in a simulated world for the purpose of teaching the player how to act in conformance with the norms of a particular culture, comprising:
a behavior module configured to cause the non-player character to perform selected programmed movements during the immersive game in the simulated world;
an authoring tool configured to receive from an author and store as mapping rules a plurality of attitudes that the non-player character may posses at some point during the immersive game in the simulated world and, for each attitude, to map a selection from the author of one or more of the programmed movements which the non-player character should perform which reflect the attitude; and
a social puppet module configured to dictate which of the programmed movements should be performed by the non-player character to reflect an attitude which the non-player character possess at a particular time during the immersive game in the simulated world by consulting the mapping rules to determine which movements correspond to the attitude,
wherein the character programming and control system thereby teaches the player how to act in conformance with the norms of a particular culture and wherein the programmed movements which each mapping rule indicates are to be performed to reflect each attitude are based on the movements which are normally made in this particular culture which reflect the attitude.

* * * * *